US005485043A

United States Patent [19]

Wakatake et al.

[11] Patent Number: 5,485,043

[45] Date of Patent: Jan. 16, 1996

[54] DISPLAY ELEMENT WITH AN ODD NUMBER OF DISPLAY SURFACES AND DISPLAY UNIT USING THE SAME

[76] Inventors: Yoshimasa Wakatake, 26-11, Kamiyoga 5-chome, Setagaya-ku, Tokyo, Japan; Masayuki Wakatake, Flat B, 12/F., Park Towers 1, 1 king's Road, North Point, Hong Kong

[21] Appl. No.: 276,325

[22] Filed: Jul. 18, 1994

[30] Foreign Application Priority Data

Jul. 20, 1993 [JP] Japan .................................... 5-200394

[51] Int. Cl.$^{6}$ .................................................... H02K 37/00

[52] U.S. Cl. ............................ 310/49 R; 40/449; 310/66; 310/156; 318/490

[58] Field of Search .................................... 310/48, 49 R, 310/66, 152, 156, 184, 185, 187; 40/449, 466, 473; 318/490

[56] References Cited

U.S. PATENT DOCUMENTS

| | | | |
|---|---|---|---|
| 4,521,983 | 6/1985 | Wakatake | 40/449 |
| 4,558,267 | 10/1985 | Wakatake | 310/187 X |
| 4,558,529 | 12/1985 | Chang et al. | 40/449 |
| 4,706,398 | 11/1987 | Browne et al. | 40/449 |
| 5,045,767 | 9/1991 | Wakatake | 318/696 |

FOREIGN PATENT DOCUMENTS

| | | |
|---|---|---|
| 0093600 | 4/1983 | European Pat. Off. . |
| 0364258A3 | 11/1990 | European Pat. Off. . |
| 0520418A1 | 6/1992 | European Pat. Off. . |
| 3705488A1 | 2/1987 | Germany . |

*Primary Examiner*—Mark O. Budd
*Attorney, Agent, or Firm*—Sixbey, Friedman, Leedom & Ferguson; Gerald J. Ferguson, Jr.

[57] ABSTRACT

In display comprising a display surface member with a plurality of display surfaces, and a permanent magnet type motor mechanism composed of a stator having magnetic members each forming a magnetic pole at one free end and excitation windings wound on the magnetic members and a rotor having a magnet member with a double-pole permanent magnet, the number of display surfaces of the display surface member is three or more odd number; the numbers of magnetic members and excitation windings of the rotor are also odd in accordance with the number of display surfaces and the magnet member of the rotor has a first magnetic pole opposed to the magnetic pole of one of the odd number of magnetic members and a second magnetic pole opposed to the magnetic poles of the other two adjacent magnetic members.

8 Claims, 29 Drawing Sheets

First State

Second State

Fifth State

From First State
To Fifth State

DISPLAY ELEMENT WITH AN ODD NUMBER OF DISPLAY SURFACES AND DISPLAY UNIT USING THE SAME

BACKGROUND OF THE INVENTION

1. Field of the Invention

The present invention relates to a display element which is provided with a display surface member having three or more odd display surfaces and is turned to select a desired one of the display surfaces. The invention also pertains to a display unit employing such display elements.

2. Description of the Prior Art

In Japanese Pat. Laid-Open No. 794995/87 there are disclosed a display element having four display surfaces and a display unit using such display elements.

The conventional display element has a display surface member with four display surfaces and a permanent magnet type motor mechanism. The display surface member is mounted on a rotor of the permanent magnet type motor mechanism housed therein and the four display surfaces are arranged side by side around the axis of the rotor.

The rotor of the permanent magnet type motor mechanism has first and second magnet members disposed side by side lengthwise thereof and each having north and south poles. The first and second magnet members are each a bar- or plate-like member of a narrow rectangular cross section in a direction perpendicular to the axis of the rotor and having the north and south poles at its both free end faces spaced an angular distance of 180 degrees apart around the axis of the rotor. The bar- or platelike member is mounted on the rotor shaft, with the center of the former in the above-mentioned cross section held in agreement with the center of the rotor axis. The north and south poles of the second magnet members are disposed around the axis of the rotor at an angular distance of plus or minus alpha degrees (where 0 degree is equal to or smaller than alpha degrees which is smaller than 180 degrees) from the north and south poles of the first magnet member.

Furthermore, the rotor of the permanent magnet type motor mechanism has a first magnetic member with first and second poles which act on the north and south poles of the first magnet member, a second magnet member with third and fourth poles which act on the north and south poles of the second magnet member, a first excitation winding wound on the first magnetic member in a manner to excite the first and second poles in opposite polarities, and a second excitation winding wound on the second magnetic member in a manner to excite the third and fourth poles in opposite polarities. The first and second poles of the first magnetic member are disposed at an angular distance of 180 degrees around the rotor axis. The third and fourth poles of the second magnetic member are disposed around the rotor axis at an angular distance of plus or minus 90 degrees plus or minus alpha degrees from the first and second poles of the first magnetic member. The first and second poles of the first magnetic member and the third and fourth poles of the second magnetic member respectively extend over an angular range of about 90 degrees around the rotor axis.

The display unit, disclosed in the afore-mentioned prior application, has the above-described display element and a drive unit therefor.

The drive unit has: first power supply means for supplying power to the first excitation winding of the display element to magnetize the first and second poles with the north and south magnetic poles; second power supply means for supplying power to the first excitation winding to magnetize the first and second poles with the north and south magnetic poles; third power supply means for supplying power to the second excitation winding of the display element to magnetize the third and fourth poles of the second magntic member with the north and south magnetic poles; and fourth power supply means for supplying power to the second excitation winding to magnetize the third and fourth poles with the south and north manetic poles.

With the disply element of the above-described construction, a selected one of the four display surfaces of the display surface member can be turned to the front display position by supplying power, in required polarity, to the first and second excitation windings of the rotor of the permanent magnet type motor mechanism.

Even if the power supply to the first and second excitation windings is cut off after turning the selected one of the four display surfaces to the front display position, it can be held there, because the first and second magnet is members of the rotor of the motor mechanism still act on the first and second magnetic members of the stator.

Moreover, since the permanent magnet type motor mechanism is housed in the display surface member, a display surface member driving mechanism need not be provided separaately of the display element.

In the display element disclosed in the afore-mentioned prior application and the display unit using it, it is necessary to supply power, in required polarities, to the first and second excitation windings of the motor mechanism to bring a desired one of the four display surfaces to the front display position-this presents some difficulty.

Besides, since the rotor of the permanent magnet type motor mechanism requires the first and second magnet members each having the north and south poles, the motor mechanism is inevitably complex and heavy, and the heavy rotor imposes a limitation on the high-speed operation of bringing a desired one of the four display surfaces to the front display position.

SUMMARY OF THE INVENTION

It is therefore an object of the present invention to provide a novel display element which is provided with an odd number of display surfaces and free from the above-mentioned defects of the prior art and a display unit employing such a display element.

The display element with an odd number of display surfaces according to the present invention comprises a display surface member having three or an odd number n of first through n-th display surfaces, and a permanent magnet type motor mechanism with a rotor and a stator. The display surface member is mounted on the rotor of the permanent magnet type motor mechanism housed therein. The first through n-th display surfaces are disposed at equiangular intervals around the rotor shaft. The stator of the permanent magnet type motor mechanism has an odd number n of first through n-th magnetic members each having a magnetic pole at one end thereof and first through n-th excitation windings wound on the first through n-th magnetic members, respectively. The poles of the first through n-th magnetic members are disposed at equiangular intervals around the rotor shaft of the motor mechanism. The rotor of the motor mechanism has a magnet member which has first and second poles magnetized in opposite polarities. Let one of the first through n-th magnetic members be identified as an i-th magnetic member. When the first pole of the magnet member is opposed to the pole of the i-th magnetic member adjacent thereto, the second pole of the magnet member is opposed to: the poles of (i+(n−1)/2)th and (i+(n−1)/2+1)th magnetic members if i<(n+1)/2; the poles of (i+(n−1)/2)th and (i−(n−1)/2)th magnetic members if i=(n+1)/2; and the poles of (i−(n+1)/2)th and (i−(n+1)2+1)th magnetic members if i>(n+1)/2.

In this instance, the magnet member forming the rotor of the permanent magnet type motor mechanism may be made up of: (A) a double-pole permanent magnet which has the above-mentioned first and second magnetic poles at its both free ends; (B) a double-pole permanent magnet and a magnetic piece attached to one free end thereof, the other free end of the double-pole permanent magnet forming the above-said first magnetic pole and the free end of the magnetic piece forming the above-said second magnetic pole; (C) a double-pole permanent magnet and a magnetic piece attached to one free end thereof, the other free end of the double-pole permanent magnet forming the above-said second pole and the free end of the magnetic piece forming the above-said first pole; or (D) a double-pole permanent magnet and first and second magnetic pieces attached to its both free ends, the free ends of the first and second magnetic pieces forming the above-mentioned first and second magnetic poles, respectively.

The first through n-th magnetic members forming the rotor of the motor mechanism may be connected to a common magnetic member at the side opposite from their magnetic poles as viewed from the first through n-th excitation windings wound on the first through n-th magnetic members, respectively.

The display unit according to the present invention comprises the above-described display element having an odd number of display surfaces and a drive unit for driving the display element. The drive unit has i-th power supply means for supplying power to an i-th one of the afore-mentioned first through n-th excitation windings to magnetize the pole of an i-th one of the above-mentioned first through n-th magnetic members in a polarity opposite to the first pole of the above-said magnet member. Alternatively, the drive unit has i-th power suplly means which supplies power to: (a) (i+(n−1)/2)th and (i+(n−1)/2+1)th ones of the first through n-tj excitation windings to the poles of the (i+(n−1)/2)th and (i+(n−1)/2+1)th magnetic members in a polarity opposite to the second pole of the afore-mentioned magnet member when i<(n+1)/2; (b) (i+(n−1)/2)th and (i−(n−1)/2)th ones of the first through n-th excitation windings to magnetize the poles of the (i+(n−1)/2)th and (i−(n−1)/2)th magnetic members in a polarity opposite to the second pole of the magnet member when i=(n+1)/2; and (c) (i−(n+1)/2)th and (i−(n+1)/2+1)th ones of the first through n-th excitation windings to magnetize the poles of the (i−(n+1)/2)th and (i−(n+1)/2+1)th magnetic members in a polarity opposite to the second pole of the magnet when i>(n+1)/2.

With the display element and the display unit according to the present invention, a desired one of the odd number n of display surfaces can be brought to the front display position by supplying power to the excitation windings of the rotor of the motor mechanism in the same fashion as is the case with the display element and the display unit set forth in the aforementioned prior application.

Even if the power supply to the excitation windings is cut off after the desired display surface is brought to the front display position, it can be held there, because the magnet member of the rotor of the permanent magnet type motor mechanism still acts on the magnetic member of the rotor.

Moreover, since the permanent magnet type motor mechanism is housed in the display surface member, there is no need of providing a display surface member driving mechanism separately of the display element as in the display element and the display unit disclosed in the aforementioned prior application.

In the display element having an odd number of display surfaces according to the present invention and the display unit using such a display element, the power supply to the excitation windings to turn the desired display surface to the front display position is easier than in the display element and the display unit of the prior application.

Furthermore, since the rotor of the motor mechanism requires only one magnet member having the north and south poles, the motor mechanism is simple and lightweight accordingly and the rotor is also lightweight; hence, the desired display surface can be brought to the front display position faster than in the display element and the display unit of the prior application.

Figure 1:
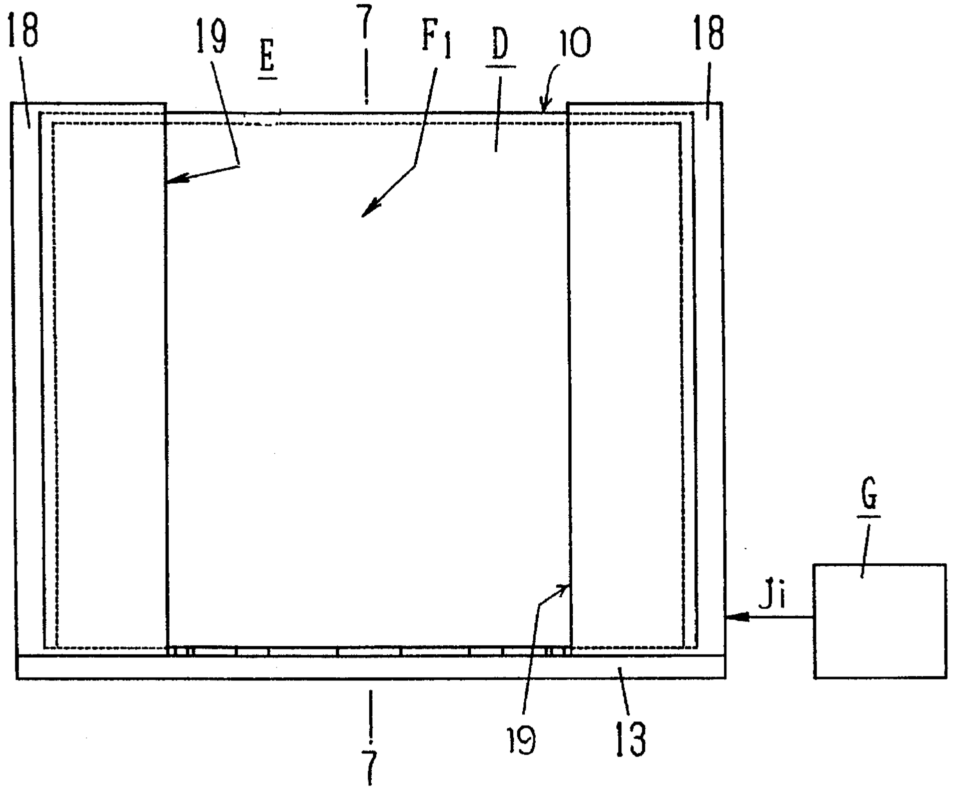
FIG. 1 is a schematic front view of a first embodiment of the display unit employing a first embodiment of the display element according to the present invention.
Figure 2:
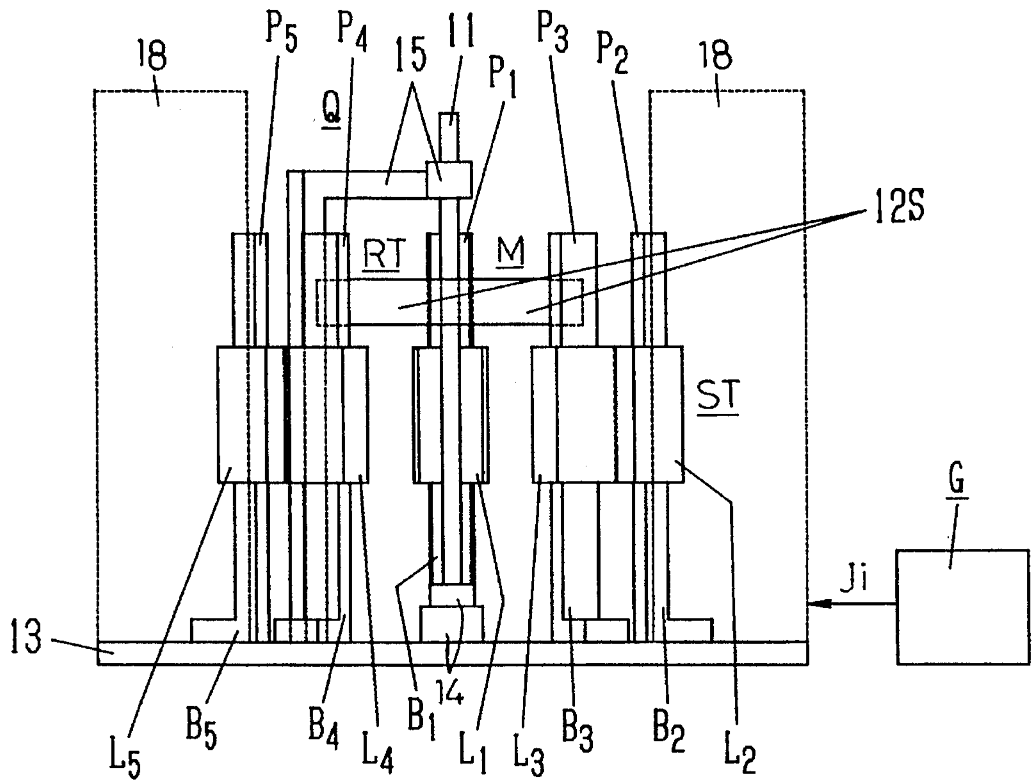
FIG. 2 is a schematic front view of the display element of FIG. 1, with the display surface member taken away.
Figure 3:
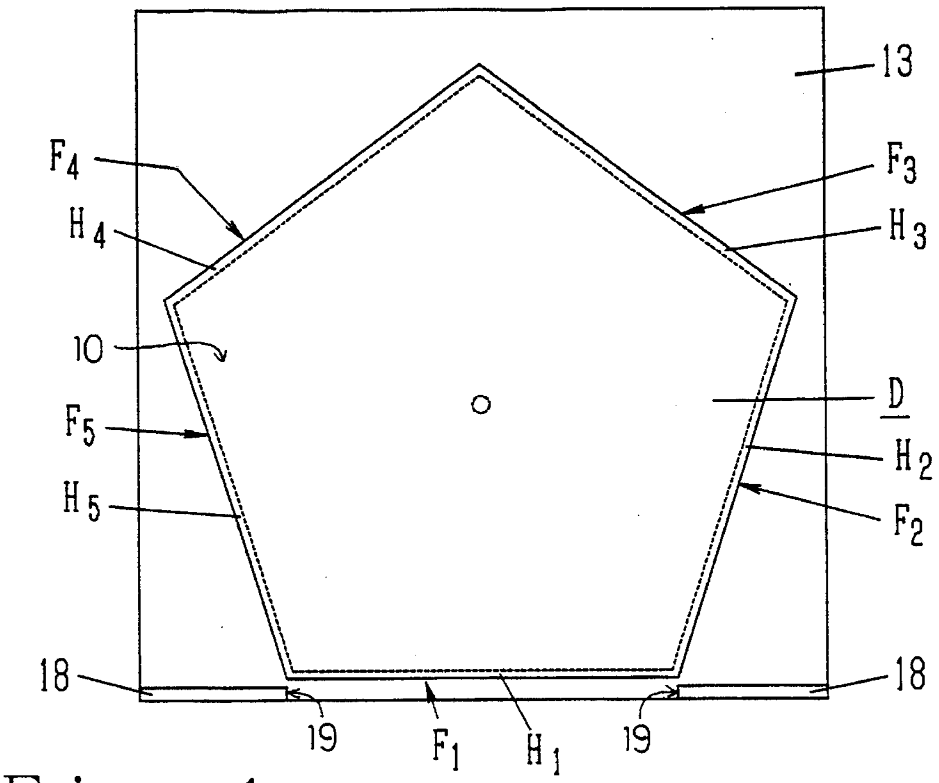
FIG. 3 is a schematic plan view of the display element of the present invention shown in FIG. 1.
Figure 4:
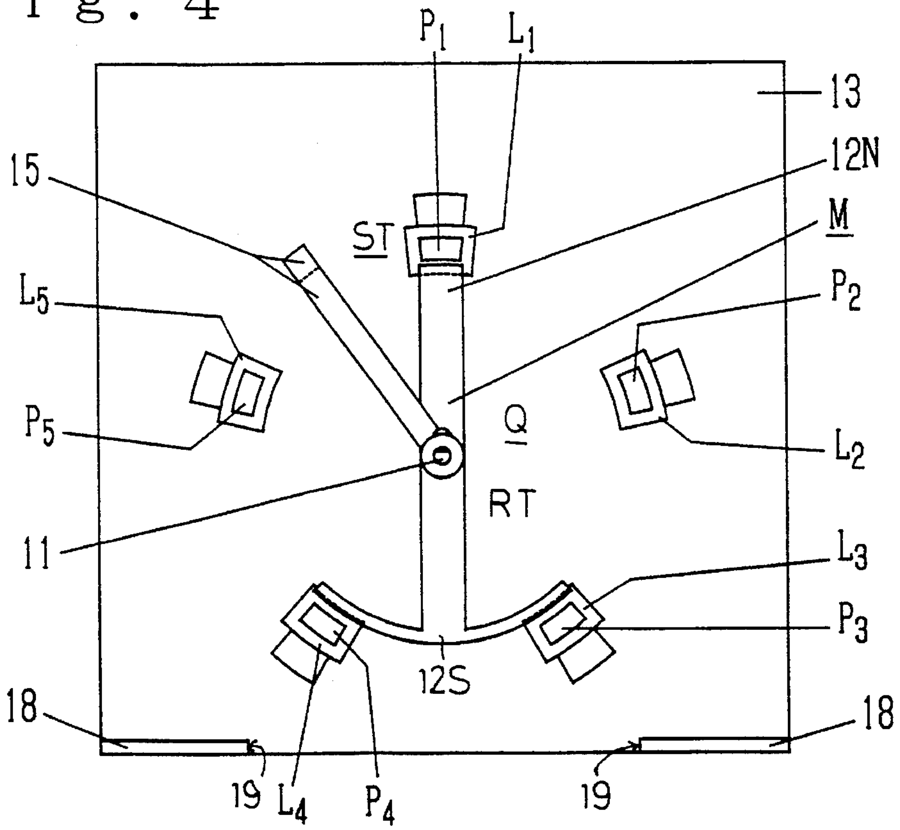
FIG. 4 is a schematic front view of the display element of FIG. 1, with the display surface member removed.
Figure 5:
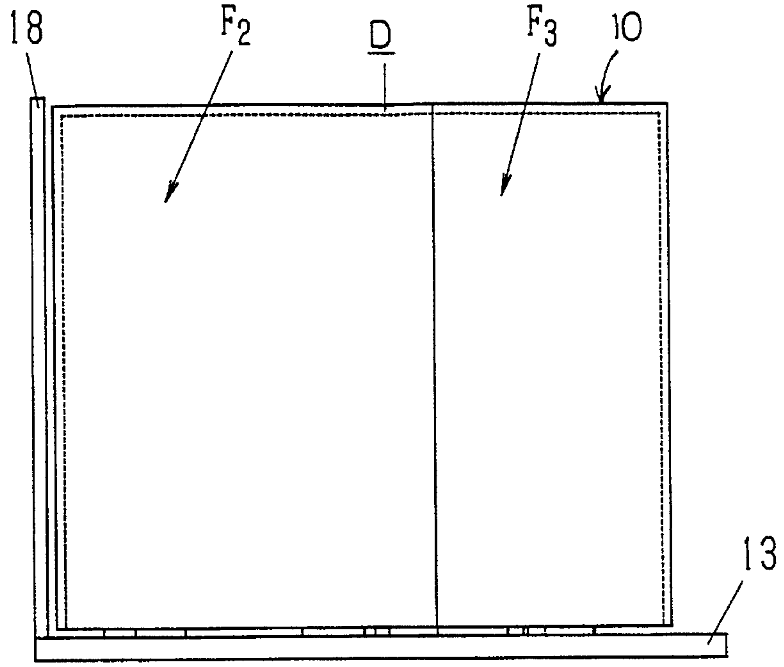
FIG. 5 is a schematic right side view of the display elemnt shown in FIG. 1.
Figure 6:
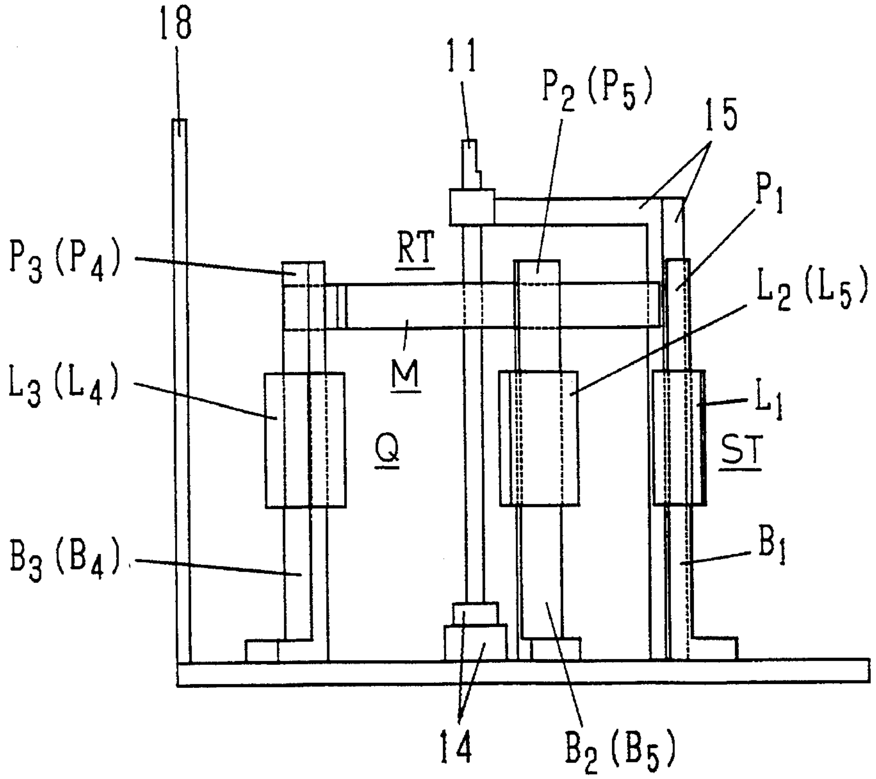
FIG. 6 is a schematic right side view of the display element shown in FIG. 1, with the display surface member taken away.
Figure 7:
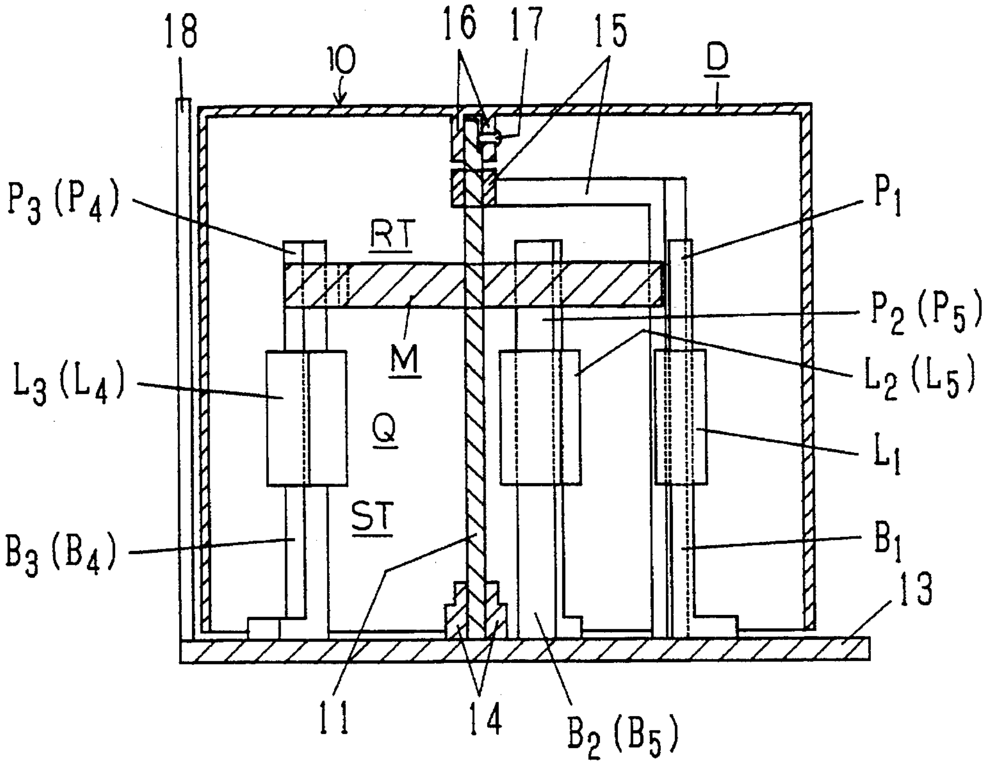
FIG. 7 is a sectional view of the display element of the present invention, taken on the line 7—7 in FIG. 1.

DESCRIPTION OF THE PREFERRED EMBODIMENTS (Embodiment 1)

A description will be given first, with reference to FIGS. 1 through 12, of a first embodiment of the display element of the present invention and a first embodiment of the display unit of the present invention which uses the display element.

The display unit of this embodiment comprises a display element E having an odd number of display surfaces and a drive unit G.

The display element E is composed of a display surface member D having five display surfaces $F_1$, $F_2$, $F_3$, $F_4$ and $F_5$ and a permanent magnet type motor mechanism Q having a rotor RT and a stator ST.

The rotor RT of the motor mechanism Q has a rotary shaft 11 planted on a non-magnetic base plate 13. In this case, the rotary shaft 11 has its lower end portion secured to the base plate 13 by means of bearings 14 and its upper end portion supported by the base plate 13 through a support arm 15.

The stator ST of the motor mechanism Q has first, second, third, fourth and fifth band-plate-like magnetic members $B_1$, $B_2$, $B_3$, $B_4$ and $B_5$ planted on the base plate 13 at equiangular intervals around the rotary shaft 11 of the rotor RT and having at their free ends magnetic poles $P_1$, $P_2$, $P_3$, $P_4$ and $P_5$, respectively, and first, second, third, fourth and fifth excitation windings $L_1$, $L_2$, $L_3$, $L_4$ and $L_5$ wound around the first, second, third, fourth and fifth magnetic members $B_1$, $B_2$, $B_3$, $B_4$ and $B_5$, respectively.

In this instance, the magnetic poles $P_1$–$P_5$ of the first through fifth magnetic members $B_1$ through $B_5$ are concentrically arranged in the same plane around the rotary shaft 11 of the rotor RT of the motor mechanism Q at equiangular intervals of 360/5 degrees. In practice, the magnetic poles $P_1$–$P_5$ of the first through fifth magnetic members $B_1$–$B_5$ each have an arc-shaped inner face which extends concentrically with the rotary shaft 11 over an angular range of, for example, 10 degrees, sufficiently smaller than 360/5 degrees with respect to the rotary shaft 11.

The rotor RT of the motor mechanism Q has a magnet member M affixed to the rotary shaft 11. The magnet member M has first and second poles 12N and 12S magnetized with the north and south magnetic poles, respectively.

Let one of the first through fifth magnetic members $B_1$–$B_5$ of the stator ST of the rotor mechanism be identified as an i-th magnetic member Bi. When the first pole 12N (N pole) of the magnet member M is opposed to the pole Pi of the i-th magnetic member $B_i$ in close proximity to the inside thereof, the second pole 12S (S pole) of the magnet member M is opposed to: (a) the pole $P_{(i+2)}$ of the (i+(5–1)/2)th and consequently (i+2)th magnetic member B(i+2) and the pole P(i+3) of the (i+(5–1)/2+1)th and consequently (i+3)th magnetic member $B_{(i+3)}$, in close proximity to the inside thereof when i<(5+1)/2, that is, when i<3; (b) the pole $P_{(i+2)}$ of the (i+(5–1)/2)th and consequently (i+2)th magnetic member $B_{(i+2)}$ and the pole $P_{(i-2)}$ of the (i–(5–1)/2)th and consequently (i–2)th magnetic member B(i–2) in close proximity to the inside thereof when i=(5+1)/2, that is, when i<3; and (c) the pole $P_{(i-3)}$ of the (i–(5+1)/2)th and consequently (i–3)th magnetic member $B_{(i-3)}$ and the pole $P_{(i-2)}$ of the (i–(5+1)/2+1)th and consequently (i–2)th magnetic member $B_{(i-2)}$ in close proximity to the inside thereof when i>(5+1)/2, that is, when i>3.

In practice, the pole 12N of the magnet member M has an arc-shaped outer end face extending over about the same angular range as the inner face of the pole $P_i$ of the magnetic member $B_i$, whereas the second pole 12S has an arc-shaped outer end face nearly equal to or slightly longer or shorter than (360/5)×2 degrees (a little longer than (360/5)×2 dgrees in the drawings).

Figure 10:
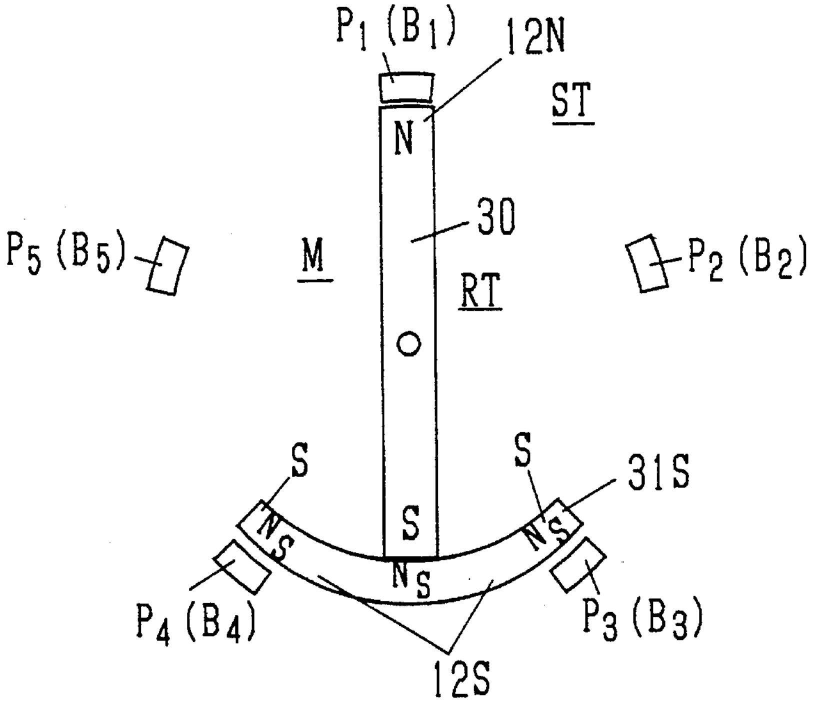
FIG. 10 is a schematic plan view illustrating another example of the magnet member of the rotor.
Figure 11:
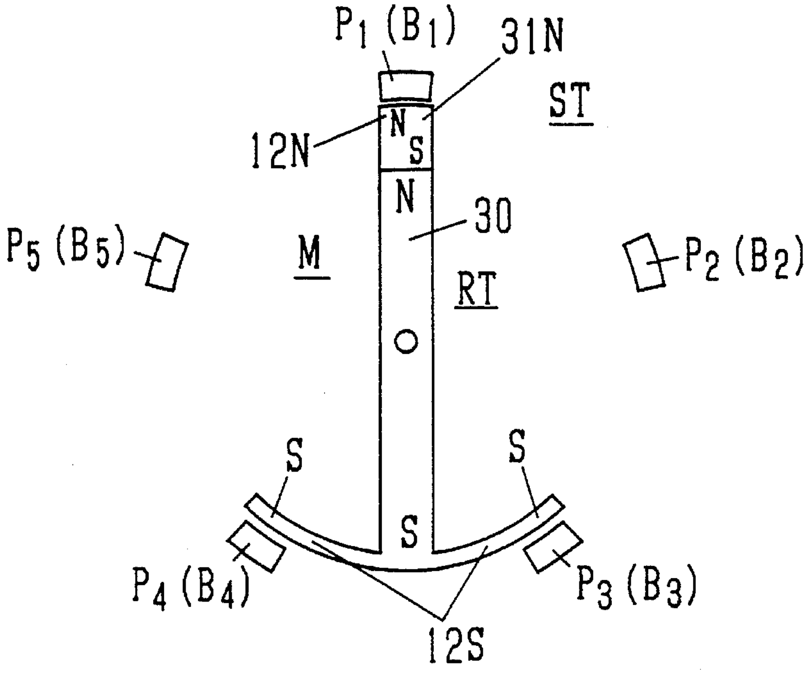
FIG. 11 is a schematic plan view illustrating another example of the magnet member of the rotor.
Figure 12:
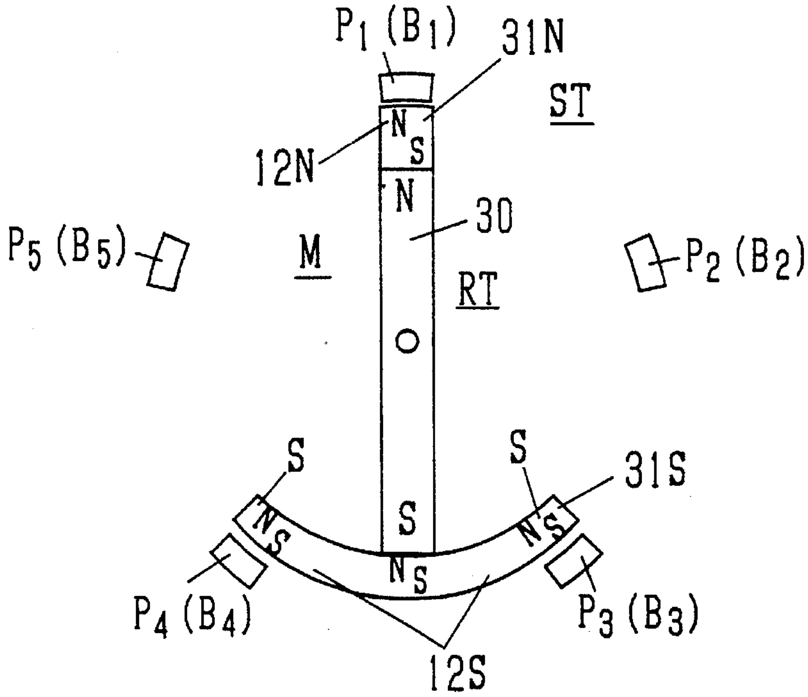
FIG. 12 is a schematic plan view illustrating still another example of the magnet member of the rotor.
Figure 13:
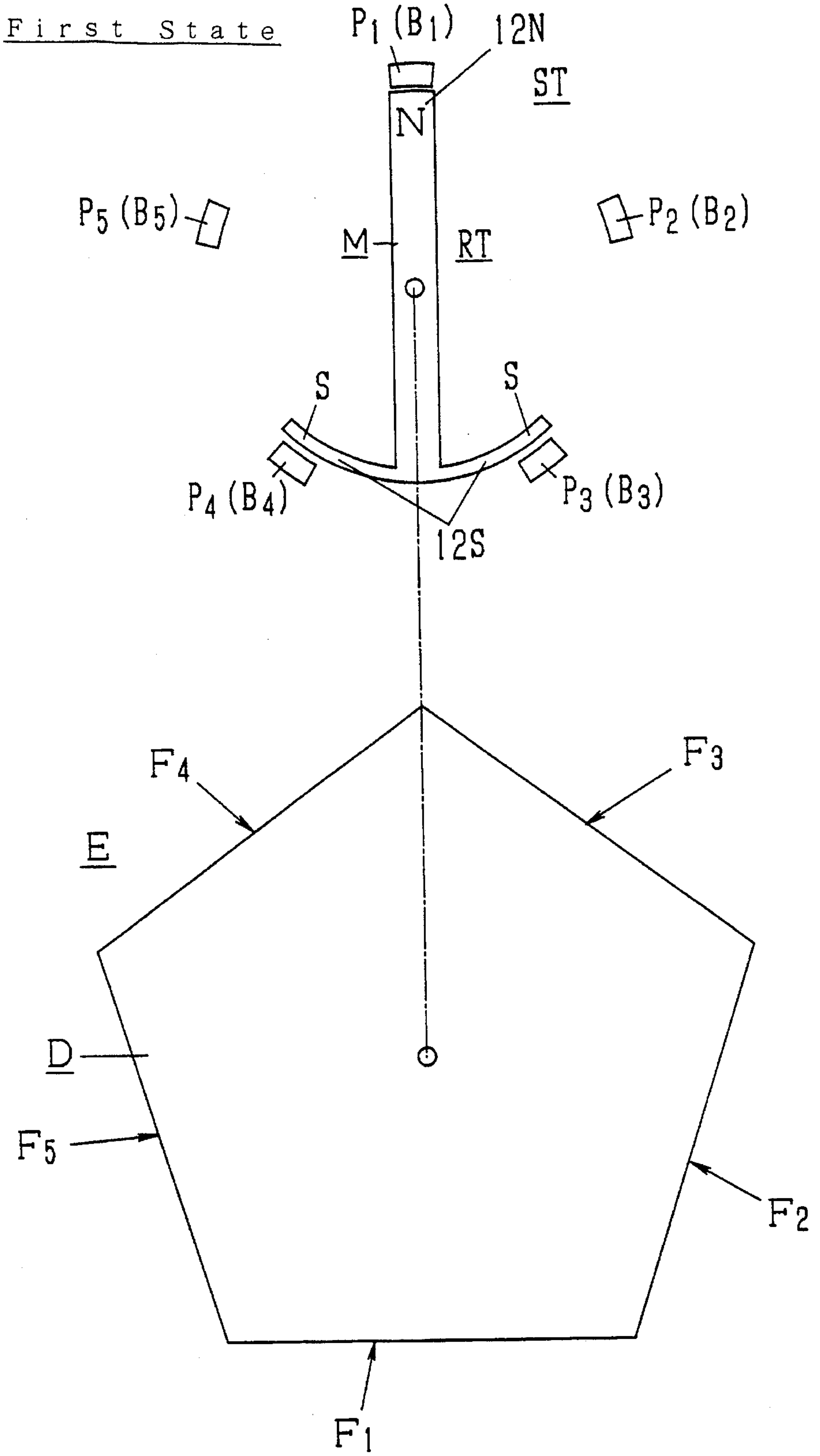
FIG. 13 is a schematic diagram showing the state of no power being supplied to the excitation windings of the motor mechanism, for explaining the operation of the display element of the present invention shown in FIG. 1.

The magnet member M forming the rotor RT of the motor mechanism Q has a construction: (A) that comprises a double-pole permanent magnet 30 which has the above-mentioned first and second magnetic poles 12N and 12S at its both free ends, respectively, as shown in FIGS. 2, 4, 6, 7 and 9; (B) a construction that comprises the double-pole permanent magnet 30 and a magnetic piece 31S attached to one free end of the magnet 30, the other free end of the magnet 30 forming the afore-mentioned first magnetic pole 12N and the free end of the magnetic piece 31S the second magnetic pole 12S, as shown in FIG. 10; (C) a construction that the double-pole permanent magnet 30 and a magnetic piece 31N attached to one free end of the magnet 30, the other free end of the magnet 30 forming the second magnetic pole 12S and the free end of the magnetic piece 31N the first magnetic pole 12N, as shown in FIG. 11; or (D) a construction that comprises the double-pole permanent magnet 30 and the first and second magnetic pieces 31N and 31S attached to its both free ends, the free ends of the first and second magnetic pieces 31N and 31S forming the first and second magnetic poles 12N and 12S, respectively, as shown in FIG. 12.

The display surface member D is formed by a five-cornered or pentagonal tubular member having its one end face covered with an end plate 10 and mounted on the rotary shaft 11 of the rotor RT of the motor mechanism Q housed in the display surface member D. The display surface member D has a construction in which five display panels $H_1$, $H_2$, $H_3$, $H_4$ and $H_5$, which form the pentagonal tubular member, are disposed concentrically around the rotary shaft 11 of the rotor RT at equiangular intervals of 360/5 degrees, and the outer surfaces of the five display panels $H_1$–$H_5$ form, for example, green, yellow, blue, white and red display surfaces $F_1$, $F_2$, $F_3$, $F_4$ and $F_5$.

Letting one of the first through fifth magnetic members $B_1$–$B_5$ of the stator ST of the permanent magnet type motor mechanism Q be identified as an i-th magnetic member $B_i$, as exemplified previously, the display surface member D is mounted on the rotary shaft 11 of the rotor RT so that when the first pole 12N (N pole) of the magnet member M of the rotor RT is opposed to the pole $P_i$ of the i-th magnetic member $B_i$ in adjacent but spaced relation thereto, the i-th display surface $F_i$ faces forward through a window 19 of a cosmetic panel 18 planted on the base plate 13 at the front edge thereof.

Next, a description will be given of the drive unit G for driving the display element E. Letting one of the first through fifth magnetic members $B_1$–$B_5$ of the rotor RT be identified as an i-th magnetic member $B_i$, as referred to above, the driven nit G has i-th power supply means $J_i$ for supplying power to the i-th excitation winding $L_i$ wound on the i-th magnetic member $B_i$ so that the pole $P_i$ of the i-th magnetic member $B_i$ is magnetized in a polarity opposite to that of the first pole 12N (N pole) of the magnet member M, that is, magnetized with the S pole.

Figure 8:
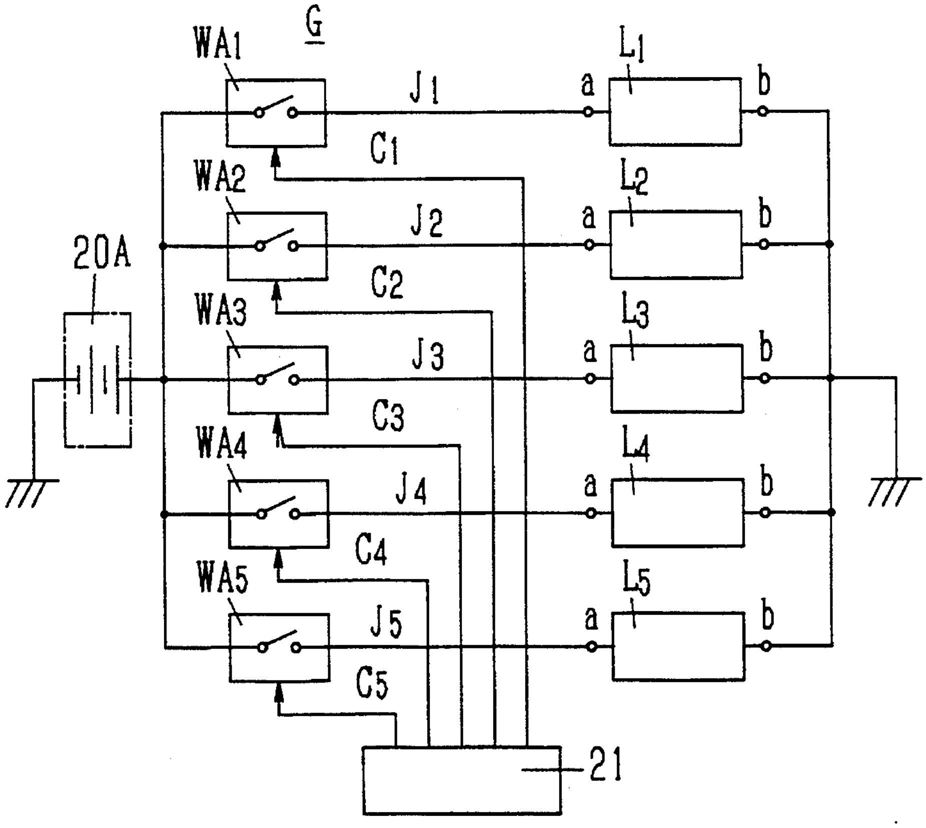
FIG. 8 is a schematic connection diagram of the drive unit, for explaining the first embodiment of the display unit according to the present invention.
Figure 9:
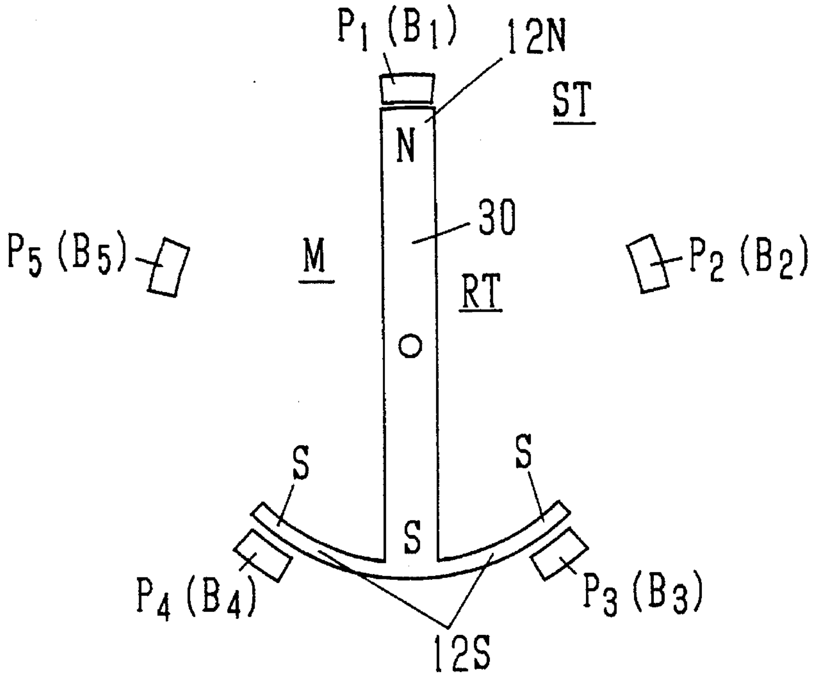
FIG. 9 is a schematic plan view illustrating an example of a magnet member forming the rotor of the permanent magnet type motor mechanism of is the display element shown FIG. 1.

In this instance, i-th power supply means $J_i$ has such a construction as shown in FIG. 8, in which the positive side of a DC power supply 20A is connected to one .end a of an i-th excitation winding $L_i$ via an i-th switching circuit $WA_i$ which is turned ON when an i-th control signal $C_i$ from a control signal generator circuit 21 is high, whereas the negative side of the DC power supply 20A is connected to the other end b of the i-th excitation winding $L_i$.

The control signal generator circuit 21 is adapted to generate the i-th control signal $C_i$ which is used to turn the i-th display surface $F_i$ to the forward-facing position, and it may be formed by a known control signal generator circuit.

With the display unit employing the first embodiment of the display element E with an odd number of display surfaces according to the present invention, letting the number of display surfaces $F_1$–$F_5$ of the display surface member D be represented by n (n=5 in this example) and one of the first through fifth magnetic members $B_1$–$B_5$ be identified as an i-th magnetic member $B_i$ as in the above, when the first pole 12N (N pole in this example) of the magnet member M is opposed to the pole $P_i$ of the i-th magnetic member $B_i$ in adjacent but spaced relation thereto, the second pole 12S (S pole in this example) of the magnet member M is opposed to: (a) the pole $P_{(i+(n-1)/2)}$ of the (i+(n–1)/2)th magnetic member $B_{(i+(n-1)/2)}$ (in this example, the pole $P_{(i+2)}$ of the (i+(5–1)/2)th and consequently (i+2)th magnetic member $B_{(i+2)}$) and the pole $P_{(i+(n-1)/2+1)}$ of the (i–(n–2)/2+1)th magnetic member $B_{(i+(n-1)/2+1)}$ (in this example, the pole $P_{(i+3)}$ of the (i+(5–1)2+1)th and consequently (i+3)th magnetic member $B_{(i+3)}$ when i<(n+1)/2 (in this example, i<(5+1)/2, that is, i<3); (b) the pole $P_{(i+(n-1)/2)}$ of the (i+(n–1)/2)th magnetic member $B_{(i+(n-1)/2)}$ (in this example, the pole P(i+2) of the (i+(5–1)/2)th and consequently (i+2)th magnetic member $B_{(i+2)}$ and the pole $P_{(i-(n-1)/2)}$ of the (i–(n–1)/2)th magnetic member $B_{(i-(n-1)/2)}$ (in this example, the pole $P_{(i+2)}$ of the (i–(5–1)2)th and consequently (i–2)th magnetic member $B_{(i-2)}$ when i=(n+1)/2 (in this example, i=(5+1)/2, that is, i=3); and (c) the pole $P_{(i-(n+1)/2)}$ of the (i–(n+1)/2)th magnetic member $B_{(i(n+1)/2)}$ (in this example, the pole $P_{(i-3)}$ of the (i–(5+1)/2)th and consequently (i–3)th magnetic member $B_{(i-3)}$) and the pole $P_{(i-(n+1)/2+1)}$ of the (i–(n+1)/2+1)th magnetic member $B_{(i-(n+1)/2+1)}$ (in this example, the pole $P_{(i-3)}$ of the (i–(5+1)2)th and consequently (i–3)th magnetic member $B_{(i-3)}$ when i>(n+1)/2 (in this example, i>(5+1)/2, that is, i>3).

Thus, in the case where (i) first through n-th control signals $C_1$–$C_n$ from the control signal generator circuit 2 1 (in this example, control signals $C_1$–$C_5$) are all at the low level and hence first through n-th switching circuits $WA_1$–$WA_n$ (in this example, first through fifth switching circuits $WA_1$–$WA_5$) of first through n-th power supply means $J_1$–$J_n$ (in this example, first through fifth power supply means $J_1$–$J_5$) are all in the OFF, and consequently, no power is supplied to any of first through n-th excitation windings $L_1$–$L_n$ (in this example, first through fifth excitation windings $L_1$–$L_5$) of the stator ST of the motor mechanism Q via the first through n-th power supply means $J_1$–$J_n$ and (ii) the first pole 12N (N pole in this example) of the magnet member M is opposed to the magnetic pole $P_i$ of the i-th magnetic member $B_i$, the rotor RT of the motor mechanism Q is at an i-th rotational position where the second pole 12S (S pole in this example) is opposed to: (a) the pole $P_{(i+(n-1)/2)}$ of the (i+(n–1)/2)th magnetic member $B_{(i+(n-1)/2)}$ (in this example, the pole $P_{(i+2)}$ of the (i+(5–1)/2)th and consequently (i+2)th magnetic member $B_{(i+2)}$) and the pole $P_{(i+(n-1)/2+1)}$ of the (i+(n–2)/2+1)th magnetic member $B_{(i+(n-1)/2+1)}$, (in this example, the pole $P_{(i+3)}$ of the (i+(5–1)2+1)th and consequently (i+3)th magnetic member $B_{(i+3)}$, when i<(n+1)/2 (in this example, i<(5+1)/2, that is, i<3); (b) the pole $P_{(i+(n-1)/2)}$ of the (i+(n–1)/2)th magnetic member $B_{(i+(n-1)/2)}$ (in this example, the pole $P_{(i+2)}$ of the (i+(5–1)/2)th and consequently (i+2)th magnetic member $B_{(i+2)}$) and the pole $P_{(i-(n-1)/2)}$ of the (i–(n–1)/2)th magnetic member $B_{(i-(n-1)/2)}$ (in this example, the pole $P_{(i-2)}$ of the (i–(5–1)/2)th and consequently (i–2)th magnetic member $B_{(i-2)}$) when i=(n+1)/2 (in this example, i=(5+1)/2, that is, i=3); and (c) the pole $P_{(i-(n+1)/2)}$ of the (i–(n+1)/2)th magnetic member $B_{i-(n+2)/3)}$ (in this example, the pole $P_{(i-3)}$ of the (i–(5+1)/2)th and consequently (i–3)th magnetic member $B_{i-3)}$) and the pole $P_{(i-(n+1)/2+1)}$ of the (i–(n+1)/2+1)th magnetic member $B_{(i-(n+1)/2+1)}$ (in this example, the pole $P_{(i-2)}$ of the (i–(5+1)/2)th and consequently (i–2)th magnetic member $B_{(i-2)}$ when i>(n+1)/2 (in this example, i>(5+1)/2, that is, i>3).

It is also evident from the above that when the rotor RT of the motor mechanism Q is at such an i-th rotational position, the display element E is in an i-th state in which an i-th display surface $F_i$ of the display surface member D is held at the forward display position.

FIGS. 13, 14, 15, 16 and 17 respectively show first, second, third, fourth and fifth states of the display element E in which first, second, third, fourth and fifth display surfaces $F_1$, $F_2$, $F_3$, $F_4$ and $F_5$ of the display surface member D face forward.

Now, let one of the first through n-th magnetic member $B_1$–$B_n$ ($B_1$–$B_5$ in this example) be identified as an i-th magnetic member $B_i$ as in the above and another magnetic member as a j-th magnetic member $B_j$. Consider that the display element E is in the above-mentioned i-th state in which the i-th display surface $F_i$ of the display surface member D is facing forward. Generating a j-th control signal $C_j$ from the control signal generator circuit 21 at the high level for a very short period of time to turn ON a j-th switching circuit $WA_j$ of j-th power supply means $J_j$ for a very short period of time to supply power from the power supply 20A via the j-th power supply means $J_j$ to a j-th excitation winding $L_j$ wound on the j-th magnetic member $B_j$, the pole $P_j$ of the j-th magnetic member $B_j$ is magnetized in a polarity (S pole in this example) opposite to that of the first pole 12N (N pole in this example) of the magnet member M as shown in FIGS. 18 through 21. FIGS. 18 through 21 show the cases where i=1 and j=2,3,4 and 5, respectively.

Now, set q=j–i. When the pole $P_j$ of the j-th magnetic member $B_j$ is apart from the pole $P_i$ of the i-th magnetic member $B_i$ by an angular distance q times larger than (360/n degrees) (360/5 degrees) in this example) in the clockwise direction about the rotary shaft 11 of the rotor RT of the motor mechanism Q and by an angular distance (5–q) times larger than (360/n derees) in the counterclockwise direction, the rotor RT turns as follows.

Figure 14:
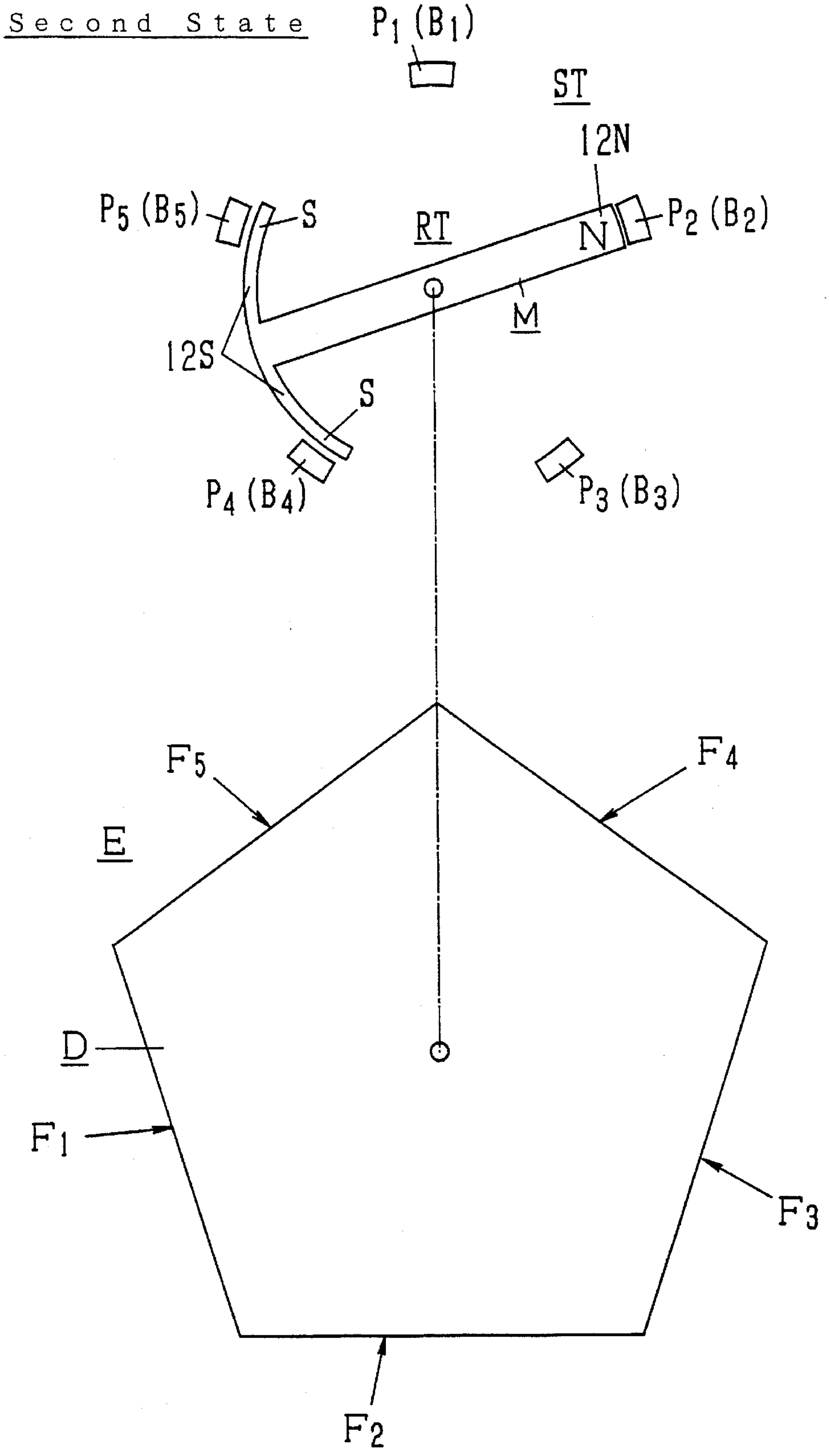
FIG. 14 is a schematic diagram showing the state of no power being supplied to the excitation windings of the motor mechanism, for explaining the operation of the display element of the present invention shown in FIG. 1.
Figure 15:
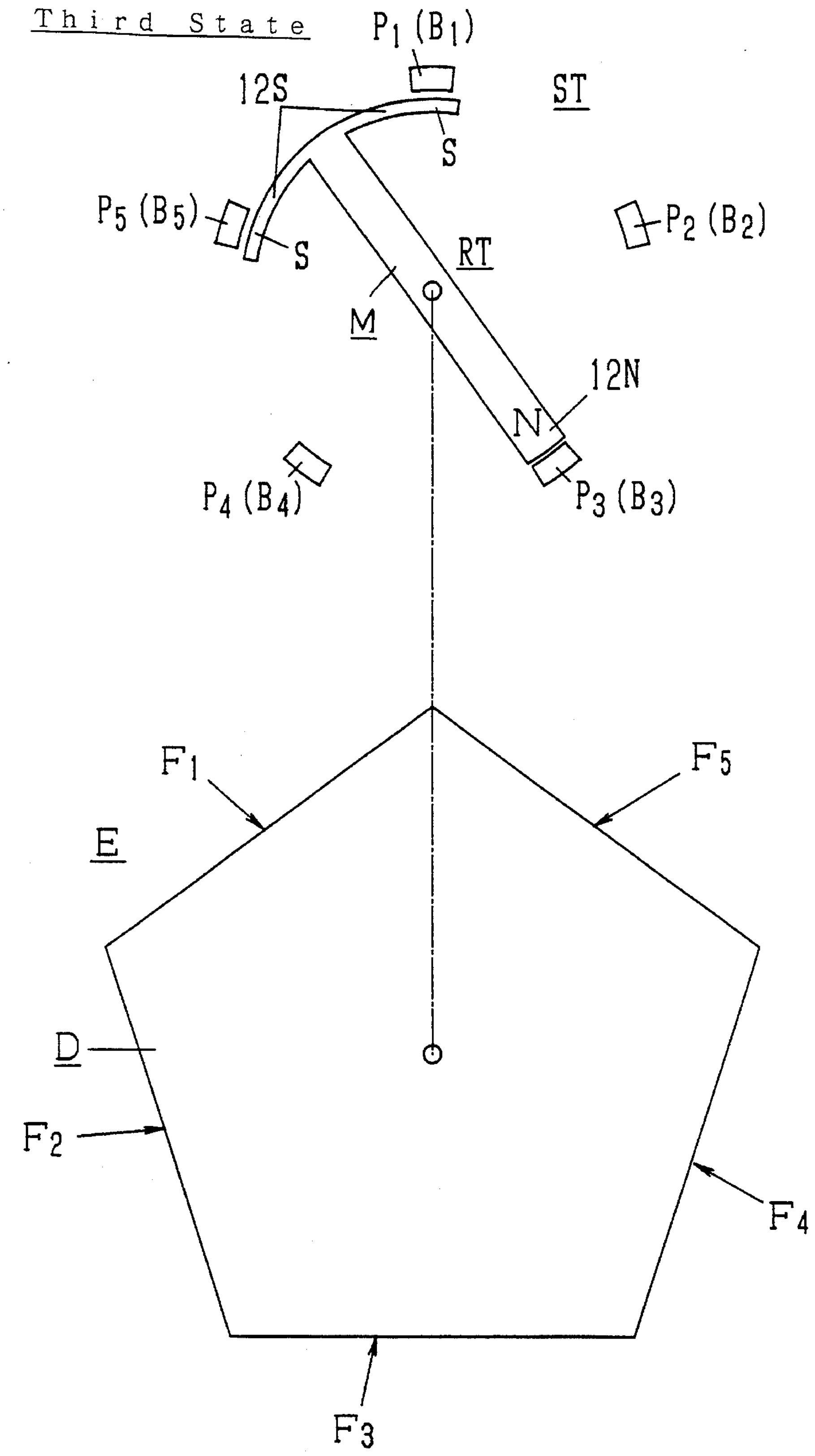
FIG. 15 is a schematic diagram showing the state of no power being supplied to the excitation windings of the motor mechanism, for explaining the operation of the display element of the present invention shown in FIG. 1.

(A) When q<(n+1)/2 ((q<5+1)/2 in this example, that is, q<3), the angular distance (360/n degree)×q ((360/5 degrees)×q in this example) in the clockwise direction from the first pole 12N (N pole in this example) of the magnet M opposed to the pole Pi of the i-th magnetic member $B_i$ to the pole $P_j$ of the j-th magnetic member $B_j$ magnetized as mentioned above (magnetized with the S pole in this example) is shorter than the angular distance (360/n degrees)×(n–q) ((360/5 degrees)×(5–q) in this example) in the counterclockwise direction from the first pole 12N of the magnet M to the pole $P_j$ of the magnetic member $B_j$, and the angular distance in the clockwise direction from the second pole 12S (S pole in this example) to the pole $P_j$ of the j-th magnetic member $B_j$ is longer than the angular distance between them in the counterclockwise direction; hence, torque develops clockwise in the magnet member M, driving the rotor RT clockwise through an angle of (360/n degrees)×q ((360/5 degrees)×q in this example) as indicated by the broken lines in FIGS. 14 and 15.

Figure 16:
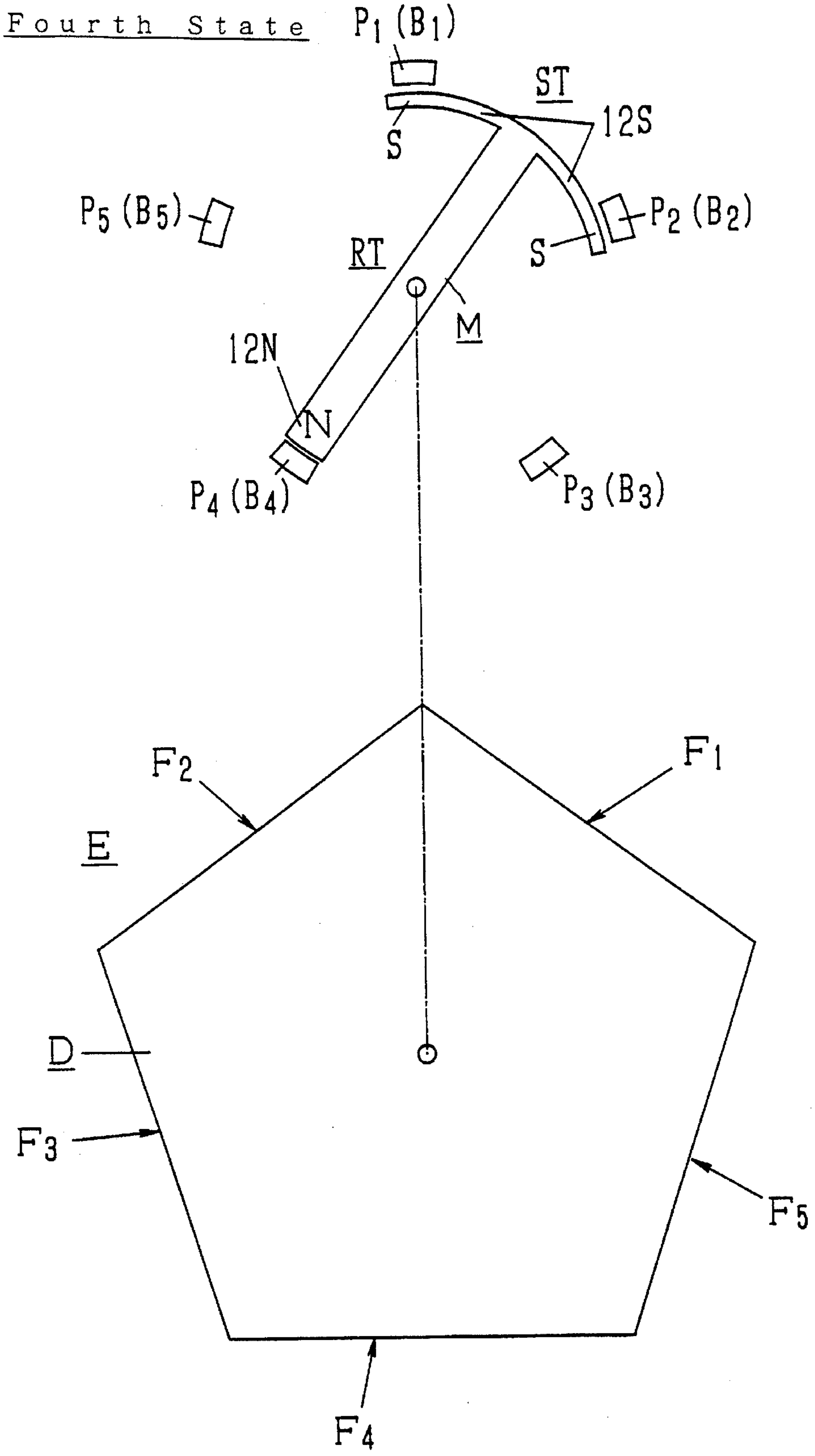
FIG. 16 is a schematic diagram showing the state of no power being supplied to the excitation windings of the motor mechanism, for explaining the operation of the display element of the present invention shown in FIG. 1.
Figure 17:
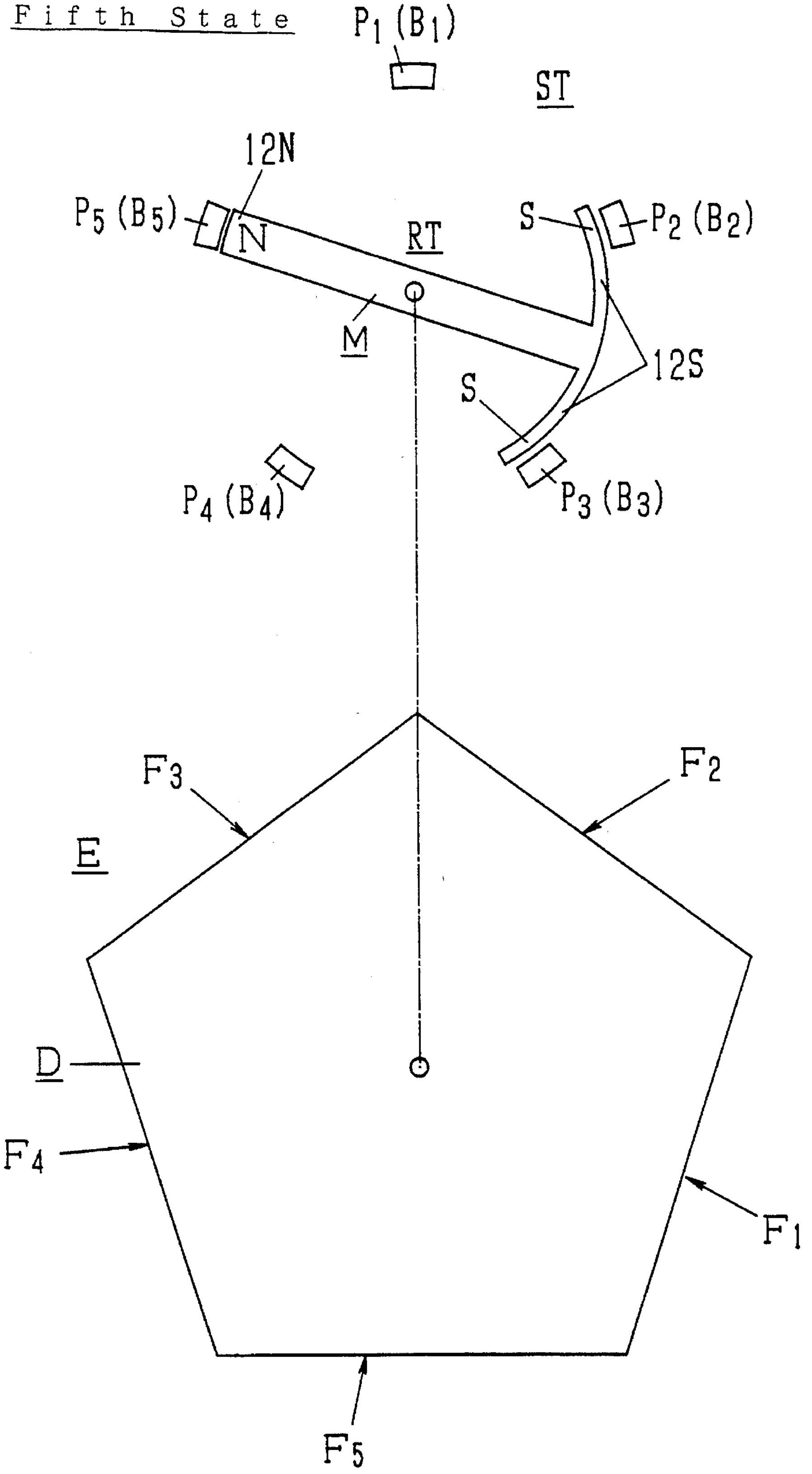
FIG. 17 is a schematic diagram showing the state of no power being supplied to the excitation windings of the motor mechanism, for explaining the operation of the display element of the present invention shown in FIG. 1.
Figure 18:
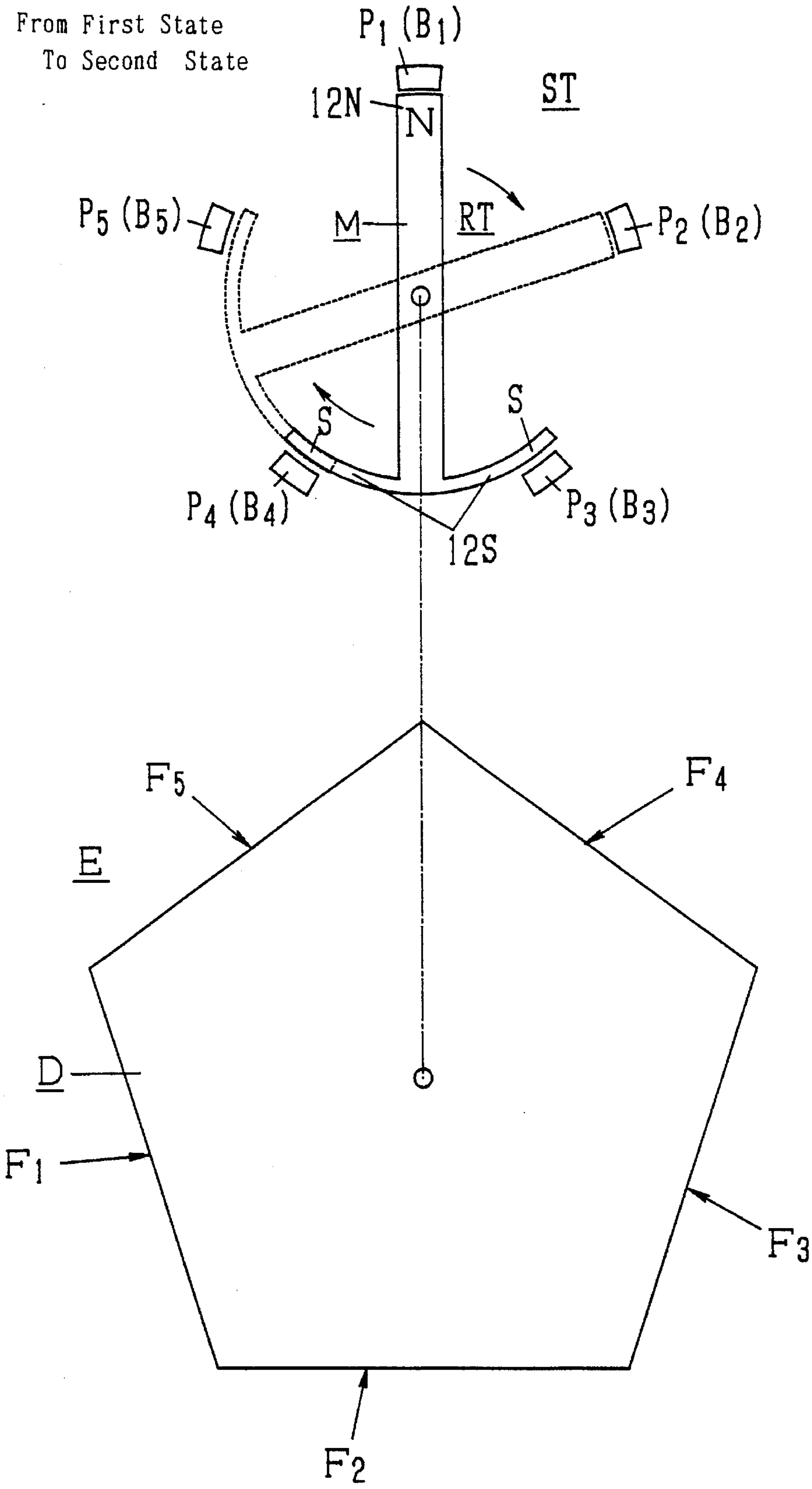
FIG. 18 is a schematic diagram showing the state of power being supplied to the excitation windings of the motor mechanism, for explaining the operation of the display element of the present invention shown in FIG. 1.
Figure 19:
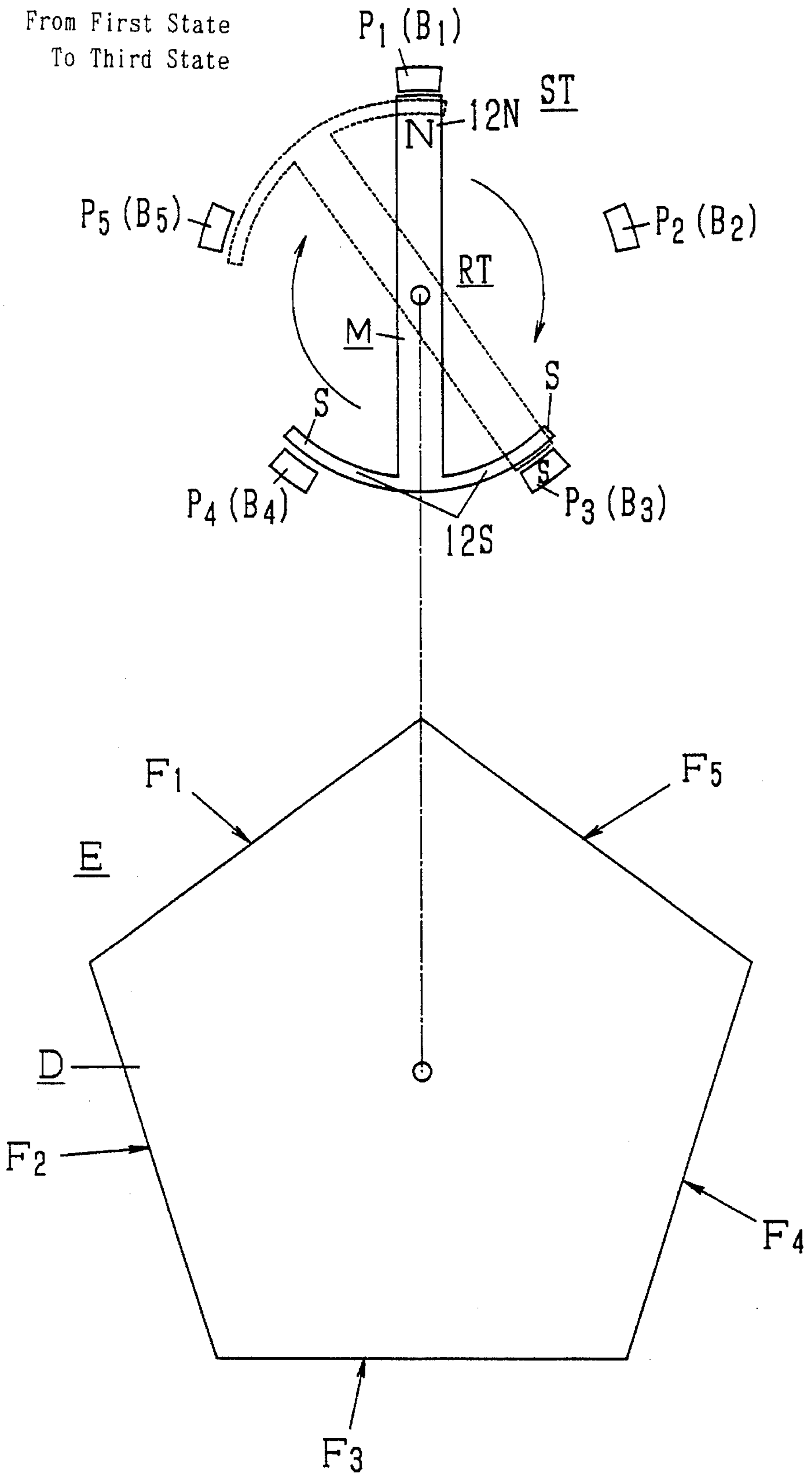
FIG. 19 is a schematic diagram showing the state of power being supplied to the excitation windings of the motor mechanism, for explaining the operation of the display element of the present invention shown in FIG. 1.
Figure 20:
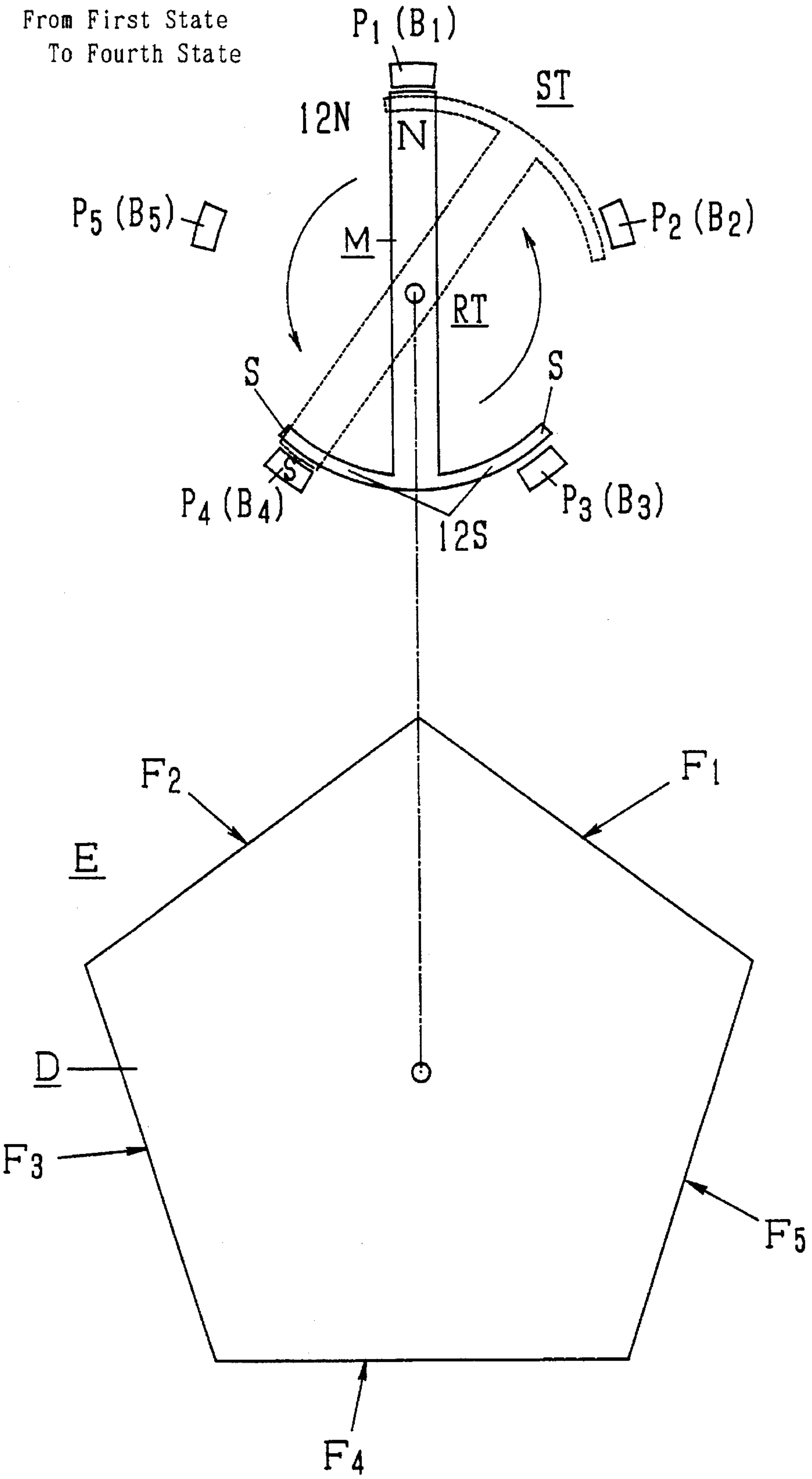
FIG. 20 is a schematic diagram showing the state of power being supplied to the excitation windings of the motor mechanism, for explaining the operation of the display element of the present invention shown in FIG. 1.
Figure 21:
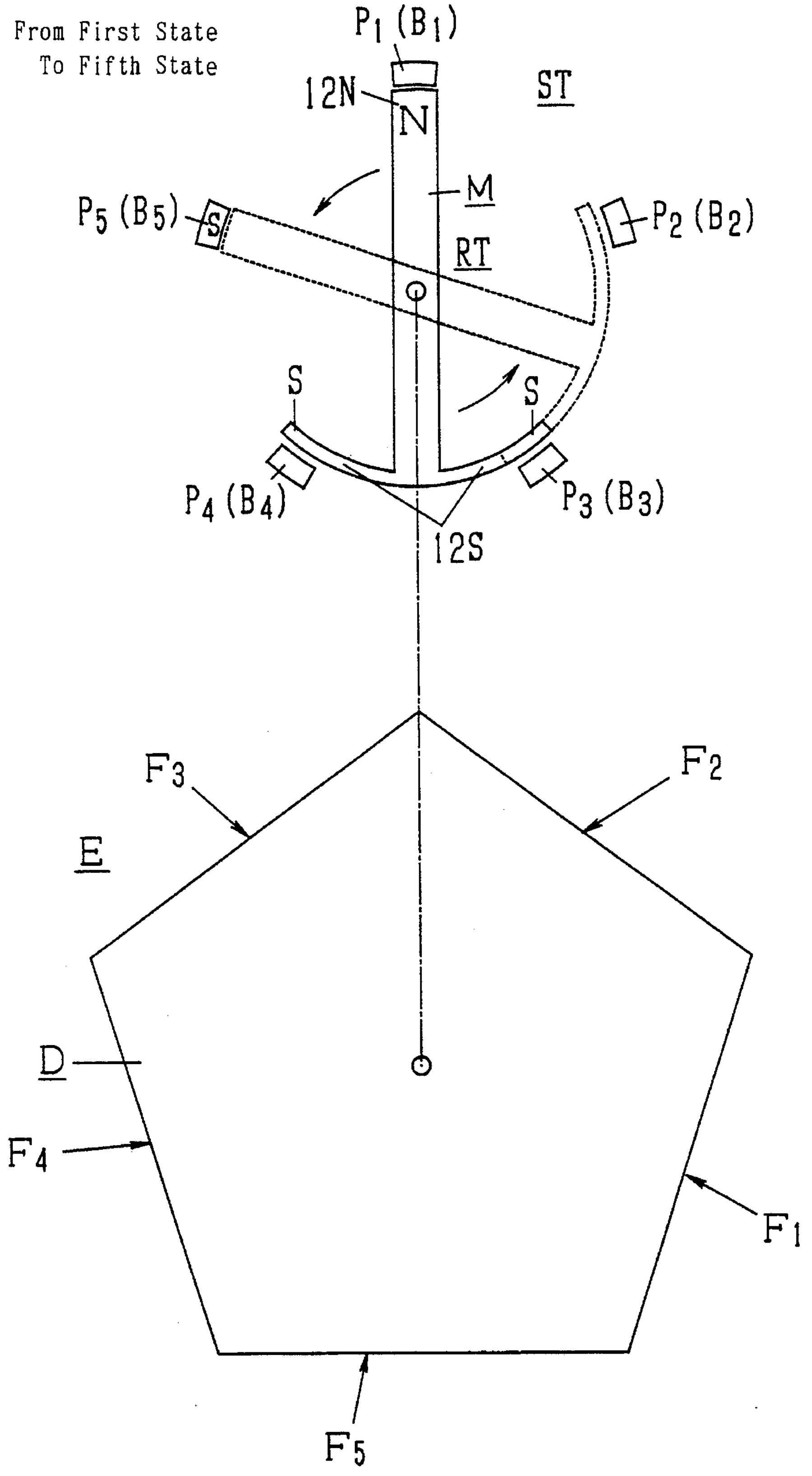
FIG. 21 is a schematic diagram showing the state of power being supplied to the excitation windings of the motor mechanism, for explaining the operation of the display element of the present invention shown in FIG. 1.

(B) When q=(n+1)/2 or q>(n+1)/2 ((q=5+1)/2 and consequently q=3, or q>3 in this example), the angular distance (360/n degree)×q ((360/5 degrees)×q in this example) in the counterclockwise direction from the pole $P_i$ of the i-th magnetic member $B_i$ to the pole $P_i$ of the i-th magnetic member $B_i$ is shorter than the angular distance (360 degrees/n)×(n–q) ((360/5 degrees)×(n–q) in this example) in the clockwise direction from the first pole 12N of the magnet M opposed to the pole $P_i$ of the i-th magnetic member $B_i$ to the pole $P_j$ of the j-th magnetic member $B_j$, and the angular distance in the counterclockwise direction from the second pole 12S to the pole $P_j$ of the j-th magnetic member $B_j$ is longer than the angular distance between them in the clockwise direction; hence, torque develops counterclockwise in the magnet member M, driving the rotor RT counterclockwise through an angle of (360/n degrees)×q ((360/5 degrees)×q in this example) as indicated by the broken lines in FIGS. 16 and 17.

and (A) the first pole 12N (N pole in this example) of the magnet member M is opposed to the pole $P_j$ of the j-th magnetic pole $B_j$ in adjacent but spaced relation thereto, and (B) the second pole 12S (S pole in this example) is opposed to: (a) the pole $P_{(j+(n-1)/2)}$ of the (j+(n–1)/2)th magnetic member $B_{(j+(n-1)/2)}$ and the pole $P_{(j+(n-1)/2+1)}$ of the (j+(n–1)/2+1)th magnetic member $B_{(j+(n-1)/2+l)}$ when j<(n+1)/2 (in this example, j<(5+1)/2, that is, j<3); (b) the pole $P_{(j+(n-1)/2)}$ of the $B_{(j+(n-1)/2)}$th magnetic member $B_{(j+(n-1)/2)}$ and the pole $P_{(j-(n-1)/2)}$ of the (j–(n–1)/2)th magnetic member $B_{(j-(n-1)/2)}$ when j=(n+1)/2 (in this example, j=(5+1)/2, that is, j=3); and (c) the pole $P_{(j-(n+1)/2)}$ of the (j–(n+1) /2)th magnetic member $B_{(j(n+1)/2)}$ and the pole $P_{(j=(n+1)/2+1)}$ of the (j–(n+1)/2+1)th magnetic member $B_{(j-(n+1)/2+1)}$ when j>(n+1)/2 (in this example j>(5+1)/2, that is j>3).

Supplying power to the i-th excitation winding $L_i$ wound on the i-th magnetic member $B_i$ via the power supply means $J_i$ for a very short time when the display element E is in the i-th state in which the i-th display surface $F_i$ of the display surface member D faces forward, the pole $P_i$ of the i-th magnetic member $B_i$ of the stator ST of the motor mechanism Q is magnetized with the south magnetic pole. At this time, however, since the first pole 12N of the magnet M of the rotor RT is opposed to the pole $P_i$ of the i-th magnetic member $B_i$, substantially no torque develops in the magnet M either of the clockwise and counterclockwise directions, and consequently, the rotor RT of the motor mechanism Q does not practically turn clockwise or counterclockwise; hence, the display element E remains in the i-th state.

As will be appreciated from the above, according to the first embodiment of the display unit of the present invention which utilizes the first embodiment of the display element shown in FIGS. 1 through 12, the display element E can easily be switched from the i-th state in which the display surface $F_i$ of the display surface member D faces forward to a j-th state in which the display surface $F_j$ faces forward, simply by supplying power via the j-th power supply means $J_j$ to the j-th excitation winding $L_j$ wound on the j-th magnetic member $B_j$.

Once the display element E is switched from the i-th to the j- th state, the power supply to the j-th excitation winding $L_j$ can be cut off for the reasons given below.

(A) The first pole 12N (N pole in this example) of the magnet M of the rotor RT acts on the pole $P_j$ of the j-th magnetic member $B_j$ of the stator ST, and (B) the second pole 12S (S pole in this example) acts on: (a) the pole $P_{(j+(n-1)/2)}$ of the (j+(n−1)/2)th magnetic member $B_{(j+(n=1)/2)}$ and the pole $P_{(j+(n-1)/\ 2+1)}$ of the (j+(n−1)/2+1)th magnetic member $B_{(j+(n-1)/2+1)}$ when j<(n+1)/2; (b) the pole $P_{(j+(n-1)/2)}$ of the $B_{(j+(n-1)/2)}$th magnetic member $B_{(j+(n-1)/2)}$ and is the pole $P_{(j-(n-1)/2)}$ of the (j−(n−1)/2)th magnetic member $B_{(j-(n-1)/2)}$ when j=(n+1)/2; and (c) the pole $P_{(j-(n+1)/2)}$ of the (j−(n+1)/2)th magnetic member $B_{(j-(n+1)/2)}$ and the pole $P_{(j-(n+1)/2+1)}$ of the (j−(n+1)/2+1)th magnetic member $B_{(j-(n+1)/2+1)}$ when j>(n+1)/2. Thus, the display element E is held accurately in the j-th state in which the j-th display surface $F_j$ of the display surface member D, without the necessity of providing special means separately.

Hence, the display element E can be held in the j-th state without power consumption.

Furthermore, since the display surface member D of the display element E has built therein the permanent magnet type motor mechanism Q for driving it, there is no need of providing a display surface member drive means separately of the display element E.

The present invention allows more ease in the power supply to the excitation windings of the motor mechanism than in the display element disclosed in the afore-mentioned prior application and the display unit using it, though not described in detail.

Since the rotor RT of the motor mechanism Q requires only one magnet member M having the N and S poles, the motor mechanism Q is simple-structured and lightweight. Moreover, since the rotor RT is also lightweight, the operation of bringing a desired one of the odd number of display surfaces to the forward display position can be done more rapidly than in the display element and display unit of the prior application.

By assembling a number of display units of the above-described embodiment into a panel which has many display elements arranged in a matrix form on a common flat or curved surface, a plurality of display surfaces of the may many display elements can selectively be directed to the front, making it possible to display letters, symbols, graphic forms, patterns and so forth on the panel. Accordingly, the present invention can be applied, for example, to an advertising panel, a traffic sign board and the like.

(Embodiment 2)

This embodiment of the display unit is identical in construction with the embodiment of FIGS. 1 through 12 except that the drive unit G of the construction described previously with respect to FIG. 8 is substituted with a drive unit described later in respect of FIG. 22.

Now, a description will be given of he drive unit G that is used in this embodiment. Let one of the first through filch magnetic members $B_1$–$B_2$ of the stator ST of ,the motor mechanism Q be identified as an i-th magnetic member $B_i$ as in the above. The drive unit G has an i-th power supply means $J_i$ which supplies power as follows: (a) When i<(5+1)/2, that is, when i<3, power is supplied to an (i+2)th excitation winding $L_{(i+2)}$ wound on an (i+(5−1)/2)th and consequently (i+2)th magnetic member $B_{(i+2)}$ and an (i+3)th excitation winding $L_{(i+3)}$ wound on an (i+(5−1)/2+1)th and consequently (i+3)th magnetic member $B_{(i+3)}$ so that the pole $P_{(i+2)}$ of the (i+2)th magnetic member $B_{(i+2)}$ and the pole $P_{(i+3)}$ of the (i+3)th magnetic member $B_{(i+3)}$ re magnetized in a polarity opposite to that of the second pole 12S (S pole) of the magnet M of the rotor RT, that is, magnetized with the N pole. (b) When i=(5+1)/2, that is, when i=3,k power is supplied to an (i+2)th excitation winding $L_{(i+2)}$ wound on an (i+(5−1)/2)th and consequently (i+2)th magnetic member $B_{(i+2)}$ and an (i−2)th excitation winding $L_{(i-2)}$ wound on an (i−(5−1)/2)th and consequently (i−2)th magnetic member $B_{(i-2)}$ so that the pole $P_{(i+2)}$ of the (i+2)th magnetic member $B_{(i+2)}$ and the pole $P_{(i-2)}$ of the (i−2)th magnetic member $B_{(i-2)}$ are magnetized in a polarity opposite to that of the second pole 12S (S pole) of the magnet M of the rotor RT, that is, magnetized with the N pole. (c) When i>(5+1)/2, that is, when i>3, power is supplied to an (i−3)th excitation winding $L_{(i-3)}$ wound on an (i−(5+1)/2)th and consequently (i−3)th magnetic member $B_{(i-3)}$ and an (i−2)th excitation winding $L_{(i-2)}$ wound on an (i−(5+1)/2+1)th and consequently (i−2)th magnetic member $B_{(i-2)}$ so that the pole $P_{(i-3)}$ of the (i−3)the magnetic member $B_{(i-3)}$ and the pole $P_{(i-2)}$ of the (i−2)th magnetic member $B_{(i-2)}$ are magnetized in a polarity opposite to that of the second pole 12S (S pole) of the magnet member M of the rotor RT, that is, magnetized with the N pole.

Figure 22:
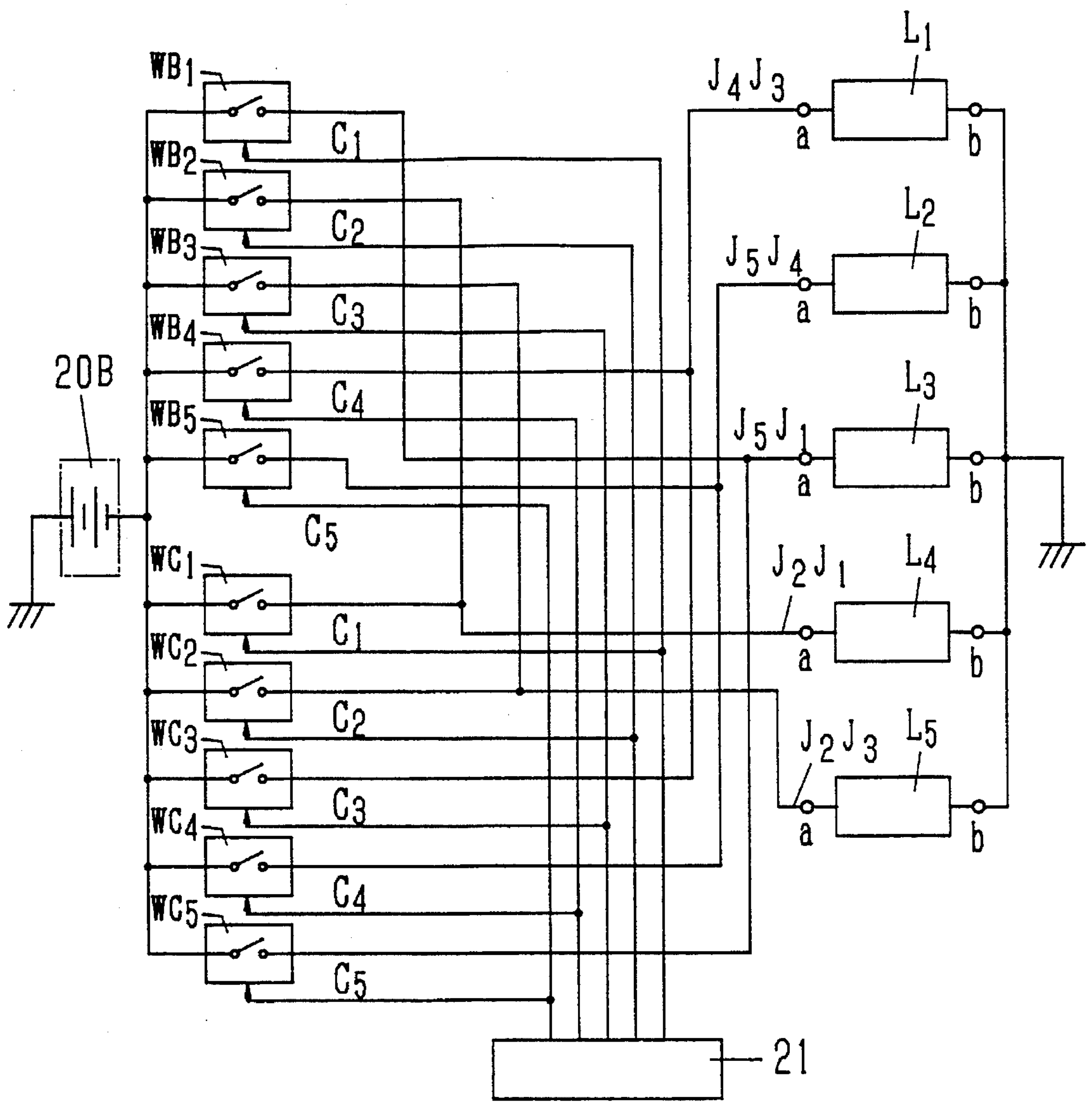
FIG. 22 is a schematic diagram showing the drive unit of the display unit using the display element of FIG. 1, for explaining a second embodiment of the display unit.
Figure 23:
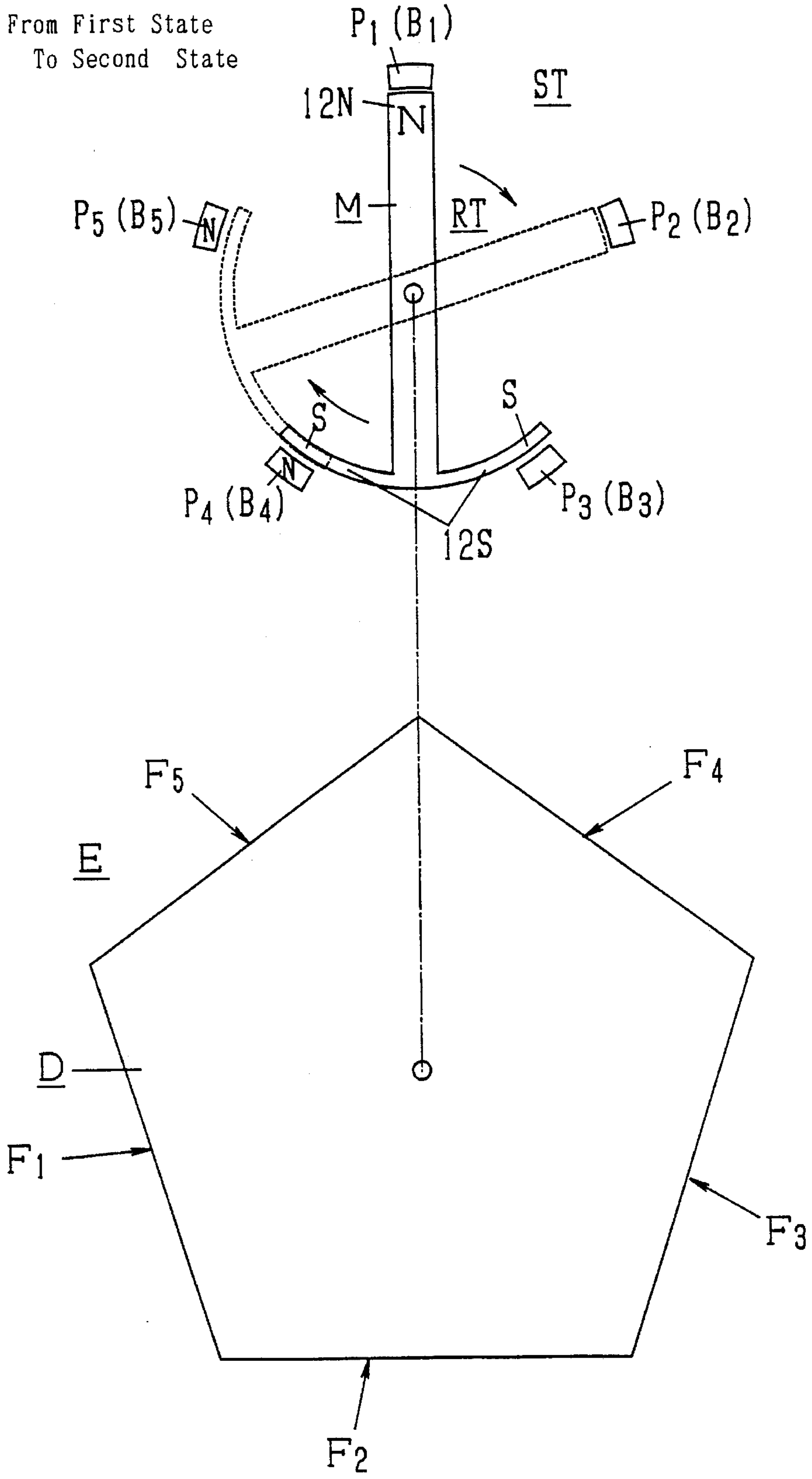
FIG. 23 is a schematic diagram showing the state of power being supplied to the excitation windings of the motor mechanism, for explaining the operation of an embodiment of the display unit of the present invention which uses the display element of FIG. 1 and the drive unit shown in FIG. 22.
Figure 24:
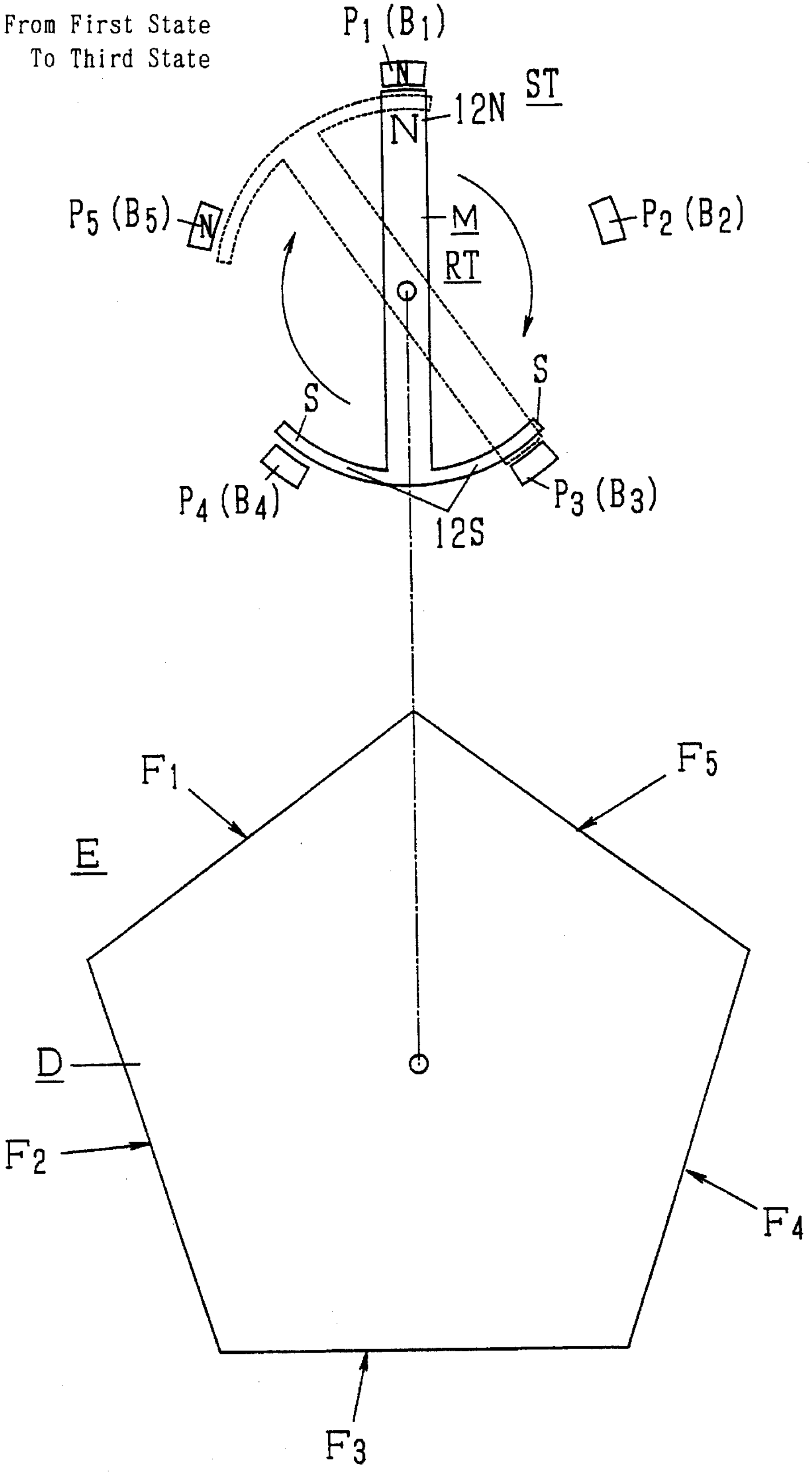
FIG. 24 is a schematic diagram showing the state of power being supplied to the excitation windings of the motor mechanism, for explaining the operation of the display unit of the present invention which uses the display element of FIG. 1 and the drive unit of FIG. 22.
Figure 25:
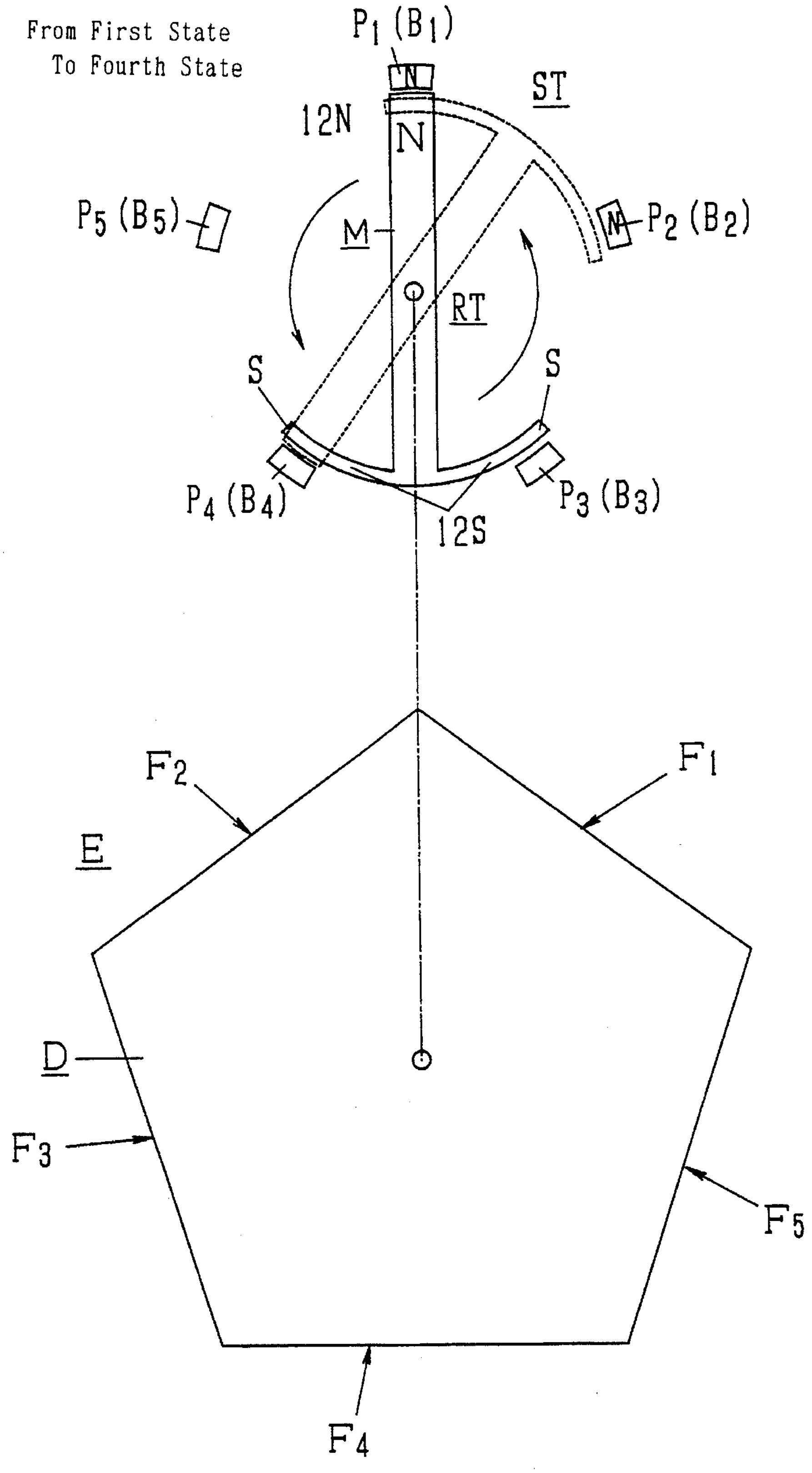
FIG. 25 is a schematic diagram showing the state of power being supplied to the excitation windings of the motor mechanism, for explaining the operation of the display element of FIG. 1 and the display unit of FIG. 22.
Figure 26:
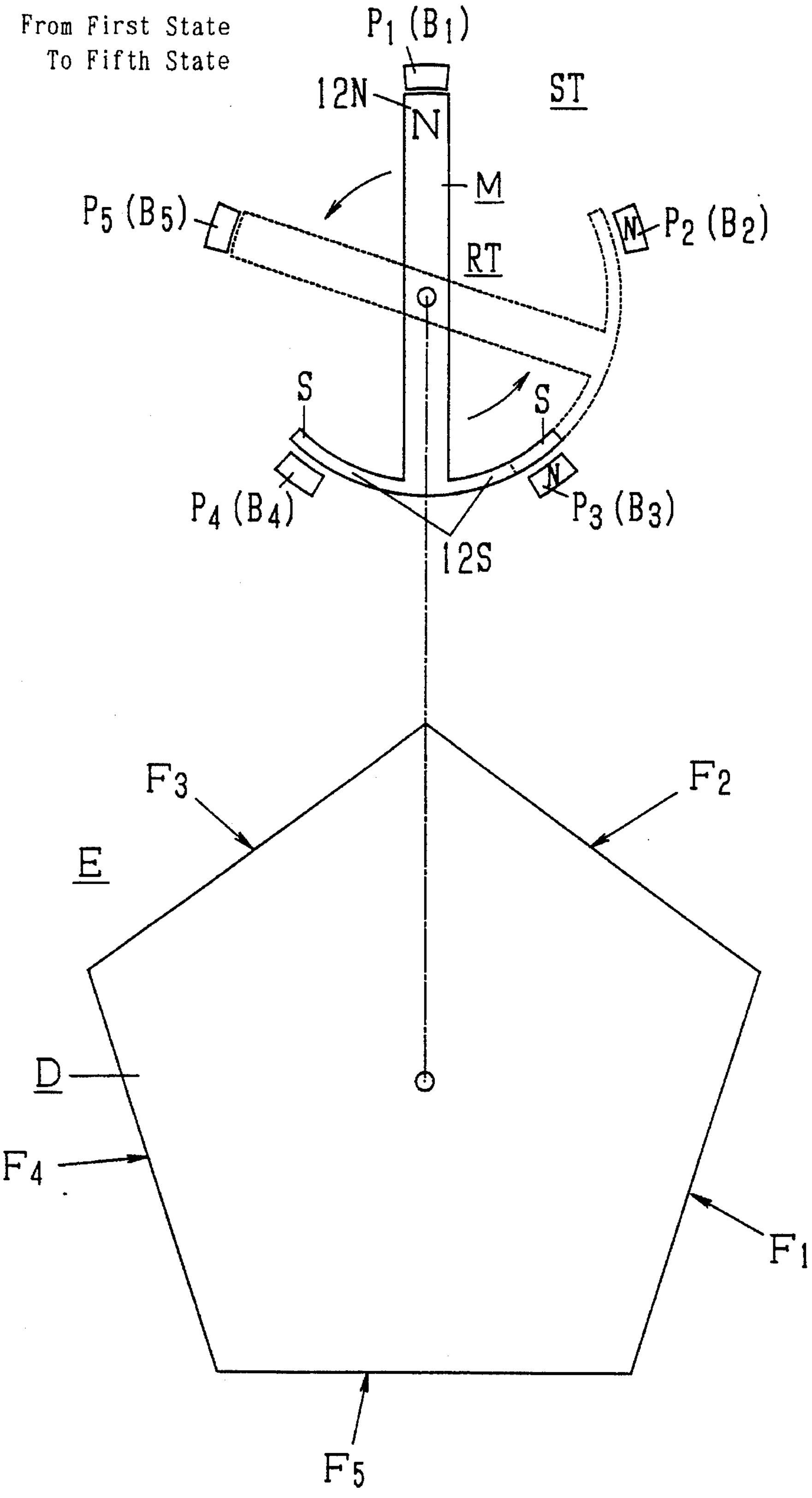
FIG. 26 is a schematic diagram showing the state of power being supplied to the excitation windings of the motor mechanism, for explaining the operation of the display element of FIG. 1 and the display unit of FIG. 22.

In this instance, the i-th power supply means $J_i$ has such a construction as shown in FIG. 22, in which the negative side of the DC power supply 20B is connected to the excitation windings via i-th switching circuits $WB_i$ and $WC_i$ which are turned ON when an i-th control signal $C_i$ from the control signal generator circuit 21 is at the high level, as described below.

That is, the negative side of the DC power supply 20B is connected to: (a) one end a of each of an (i+2)th excitation winding $L_{(i+2)}$ wound on an (i+(5−1)/2)th and consequently (i+2)th magnetic member $B_{(i+2)}$ and an (i+3)th excitation winding $L_{(i+3)}$ wound on an (i+(5−1)/2+1)th and consequently (i+3)th magnetic member $B_{(i+3)}$ when i<(5+1)/2, that is, when i<3; (b) one end a of each of an (i+2)th excitation winding $L_{(i+2)}$ wound on an (i+(5−1)/2)th and consequently (i+2)th magnetic member $B_{(i+2)}$ and an (i−2)th excitation winding $L_{(i-2)}$ wound on an (i−(5−1)/2)th and consequently (i−2)th magnetic member $B_{(i-2)}$ when i=(5+1)/2, that is, when i<3; and (c) one end a of each of an (i−3)th excitation winding $L_{(i-3)}$ wound on an (i−(51)/2)th and consequently (i−3)th magnetic member $B_{(i-3)}$ and an (i−2)th excitation winding $L_{(i-2)}$ wound on an (i−(5−1)/2+1)th and consequently (i−2)th magnetic member $B_{(i-2)}$ when i>(5+1)/2, that is, when i>3.

On the other hand, the positive side of the DC power supply 20A is conneced to: (a)the other ends b of the (i+2)th excitation winding $L_{(i+2)}$ wound on the (i+(5−1)/2)th and consequently (i+2)th magnetic member $B_{(i+2)}$ and the (i+3)th excitation winding $L_{(i+3)}$ wound on then (i+(5−1)/2+1)th and consequently (i+3)th magnetic member $B_{(i+3)}$ when i<(5+1)/2, that is, when i<3; (b) the other ends b of the (i+2)th excitation winding $L_{(i+2)}$ wound on the (i+(5−1)/2)th and consequently (i+2)th magnetic member $B_{(i+2)}$ and the (i−2)th excitation winding $L_{(i-2)}$ wound on the (i−(5−1)/2)th and consequently (i−2)th magnetic member $B_{(i-2)}$ when i=(5+1)/2, that is, when i=3; and (c)the other ends b the (i−3)th excitation winding $L_{(i-3)}$ wound on the (i−(5+1)/2)th and consequently (i−3)th magnetic member $B_{(i-3)}$ and the (i−2)th excitation winding $L_{(i-2)}$ wound on the (i−(5+1)/2+1)th and consequently (i−2)th magnetic member $B_{(i-2)}$ when i>(5+1)/2, that is, when i>3.

The second embodiment of the present invention descibed above is identical in construction with the first embodiment except the above-mentioned point, and hence produces the same effect as is obtainable with the latter.

That is, as is the case with the first embodiment, when the first through n-th switching circuits $B_1$ and $WC_1$–$WB_n$ and $WC_n$ of the first through n-th power supply means $J_1$–$J_n$ are both OFF and none of the first through n-th excitation windings $L_1$–$L_n$ of the stator ST of the motor mechanism Q is supplied with power from the DC power source 20B, the rotor RT of motor mechanism Q lies at the same i-th rotational position as described above previously with respect to FIGS. 9 through 13, holding the display element E in the i-th state in which the display surface $F_i$ of the display surface member D is facing forward.

Again, let one of the first through n-th magnetic members $B_1$–$B_n$ of the motor mechanism Q be identified as an i-th magnetic member $B_i$ and another magnetic member as a j-th magnetic member $B_j$. Consider that the display element E is in the i-th state in which the i-th display surface $F_i$ is in the front display position. Generating the j-th control signal $C_j$ from the control signal generator circuit 21 at the high level for a very short period of time, the j-th switching circuits $WB_j$ and $WC_j$ of tie j-th power supply means $J_j$ are turned ON for a very short time to supply therethrough power from the DC power supply 20A to: (a) a (j+(n−1)/2)th excitation winding $L_{(j+(n-1)/2}$ wound on a (j+(n−1)/2)th magnetic member $B_{(j+(n-1)/2)}$ and a (j+(n−1)/2+1)th excitation winding $L_{(j+(n-1)/2+1)}$ wound on a (j+(n−1)/2+1)th magnetic member $B_{(j+(n-1)/2+1)}$ when j<(n+1)/2 (in this example, j<(5+1)/2, that is, j<3; (b) a (j+(n−1)/2)th excitation winding $L_{(j+(n-1)/2}$ wound on a (j+(n−1)/2)th magnetic member $B_{(j+(n-1)/2)}$ and a (j−(n−1)/2)th excitation winding $L_{(j-(n-1)/2)}$ wound on a (j−(n−1)/2)th magnetic member B(j−(n−1)/2) when j=(n+1)/2 (in this example, j>(5)(n+i)/2, that is, j>3; (c) a (j−(n−1)/2)th excitation winding $L_{(j-(n+1)/2}$ wound on a (j−(n+1)/2)th magnetic member $B_{(j-(n+1)/2)}$ and a (j−(n+1)/2+1)th excitation winding $L_{(j-(n+1)/2+1)}$ wound on a (j−(n+1)/2+1)th magnetic member $B_{(j-(n+1)/2+1)}$ when j>(n+1)/2.

In this instance, the following poles are magnetized in a polarity (S pole in this example) opposite to that of the first pole 12N (N pole in this example) of the magnet member M as shown in FIGS. 19 through 22. Incidentally, FIGS. 23 through 26 show tie cases where i=1 and j=2, 3, 4 and 5, respectively. (a) When j<(n+1)/1 (in this example, j<(5+1)/1, that, j<3): (j+(n−1)/2)th pole $P_{(j+(n-1)/2}$ of (j+(n−1)/2)th magnetic member $B_{(j+(n-1)/2)}$ and (j+(n−1)/2+1)th pole $P_{(j+(n-1)/2+1)}$ of(j+(n−1)/2+1)th magnetic member $B_{(j+(n-1)/2+1)}$; (b) When j=(n+1)/2 (in this example, j=(5+1)/2, that is, j=3): pole $P_{(j+(n-1)/2}$ of(j+(n−1)/2)th magnetic member $B_{(j+(n-1)/2)}$ and pole $P_{(j-(n-1)/2)}$ of (j−(n−1)/2)th magnetic member $B_{(j-(n-1)/2)}$; and (c) When j>(n+1)/2 (in this example j>(5+1)/2, that is J>3): pole $P_{(j-(n+1)/2)}$ of (j−(n+1)/2)th magnetic member $B_{(j-(n+1)/2)}$ and pole $P_{(J-(n+1)/2+1)}$ of (j−(n+1) /2+1)th magnetic member $B_{(J-(n+1)/2+1)}$.

Now, set q=j−i. When the pole $P_j$ of the j-th magnetic member $B_j$ is apart from the pole $P_i$ of the i-th magnetic member $B_i$ by an angular distance q times larger than (360/n degrees) (360/5 degrees) in this example) in the clockwise direction about the rotary shaft 11 of the rotor RT of the motor mechanism Q and by an angular distance (5−q) times larger than (360/n degrees) in the counterclockwise direction, the rotor RT turns as follows. (A) When q<(n+1)/2 ((q<5+1)/2 in this example, that is, q<3), torque develops clockwise in the magnet member M for the reasons given previously with reference to FIGS. 1 through 12, though not described in detail; the rotor RT is thus driven clockwise through an angle of (360/n degrees)×q ((360/5 degrees)×q in this example) as indicated by the broken lines in FIGS. 19 and 20. (B) When q=(n+1)/2 or q>(n+1)/2 ((q=5+1)/2 and consequently q=3, or q> 3 in this example), torque develops counterclockwise in the magnet member M for the reasons given previously with reference to FIGS. 1 through 12, though not described in detail; thus, the rotor RT is driven counterclockwise through an angle of (360/n degrees)×q ((360/5 degrees)×q in this example) as indicated by the broken lines in FIGS. 21 and 22. (A) The first pole 12N (N pole in this example) of the magnet member M is opposed to the pole $P_j$ of the j-th magnetic member $B_j$ in adjacent but spaced relation thereto, and (B) the second pole 12S (S pole in this example) is opposed to: (a) the pole $P_{(j+(n-1)/2)}$ of the (j+(n−1)/2)th magnetic member $B_{(j+(n-1)/2)}$ and the pole $P_{(j+(n-1)/2+1)}$ of the (j+(n−1)/2+1)th magnetic member $B_{(j+(n-1)/2+1)}$ when j<(n+1)/2 (in this example, j<(5+1)/2, that is, j<3); (b) the pole $P_{(j+(n-1)/2)}$ of the $B_{(j+(n-1)/2)}$th magnetic member $B_{(j+(n-1)/2)}$ and the pole $P_{(j-(n-1)2)}$ of the (j−(n−1)/2)th magnetic member $B_{(j-(n-1)/2)}$ when j=(n+1)/2 (in this example, j=(5+1)/2, that is, i=3); and (c) the pole $P_{(j-(n+1)/2)}$ of the (j−(n+1)/2)th magnetic member $B_{(j-(n+1)/2+1)}$ and the pole $P_{(j-(n+1)/2+1)}$ of the (j−(n+1)/2+1)th magnetic member B(j−(n+1)/2+1) when j>(n+1)/2 (in this example j>(5+1)/2, that is j>3).

As will be appreciated from the above, according to the second embodiment of the display unit of the present invention which utilizes the display element, the display element E can easily be switched from the i-th state in which the display surface $F_i$ of the display surface member D faces forward to the j-th state in which the display surface $F_j$ faces forward, as is the case with the display unit described previously with reference to FIGS. 1 through 12.

Though not described in detail, this embodiment also produces the same effects as those obtainable with the first embodiment.

(Embodiment 3)

Figure 27:
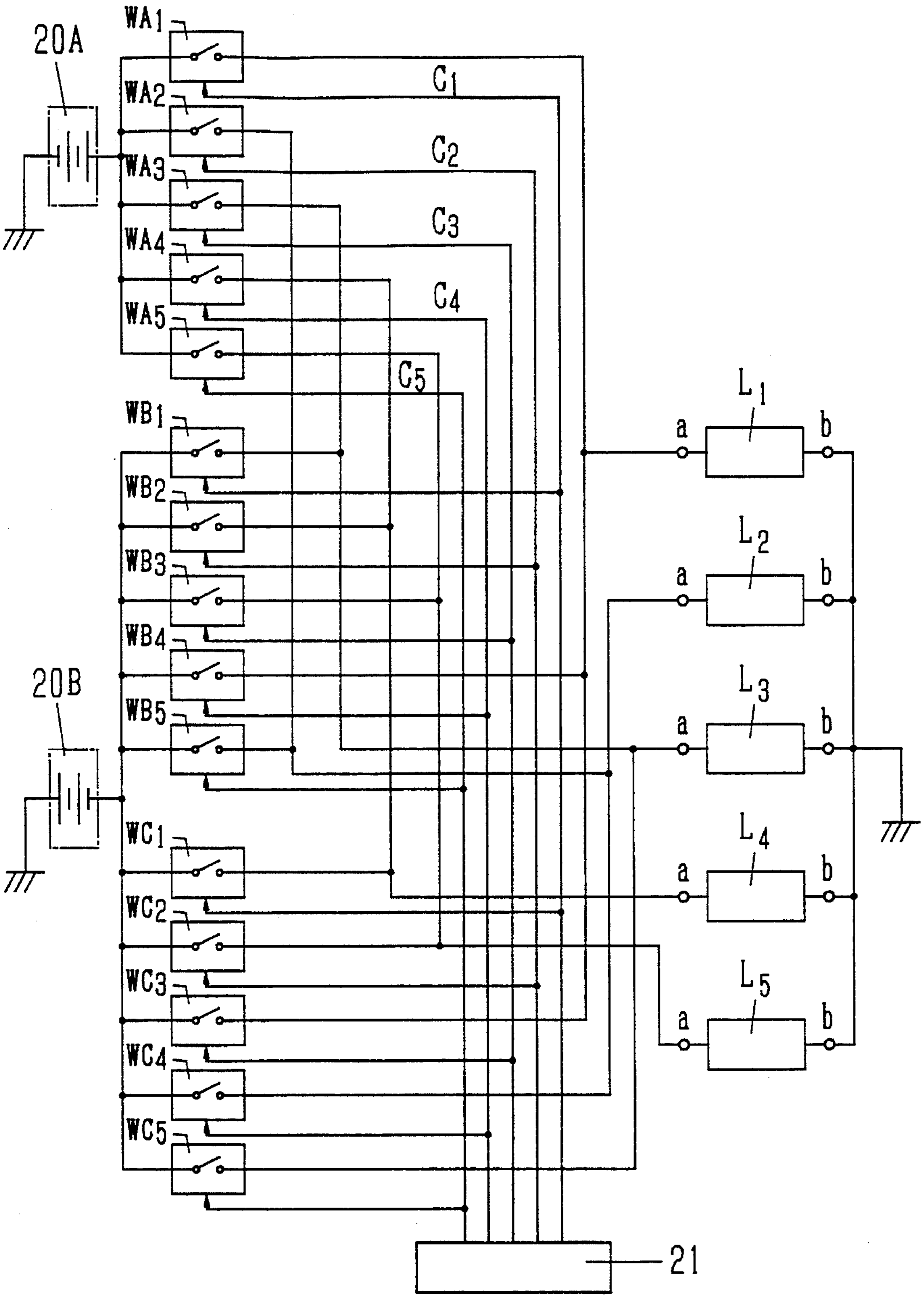
FIG. 27 is a schematic diagram showing the drive unit of a third embodiment of the display unit of the present invention which uses the display element of FIG. 1, for explaining the embodiment.
Figure 28:
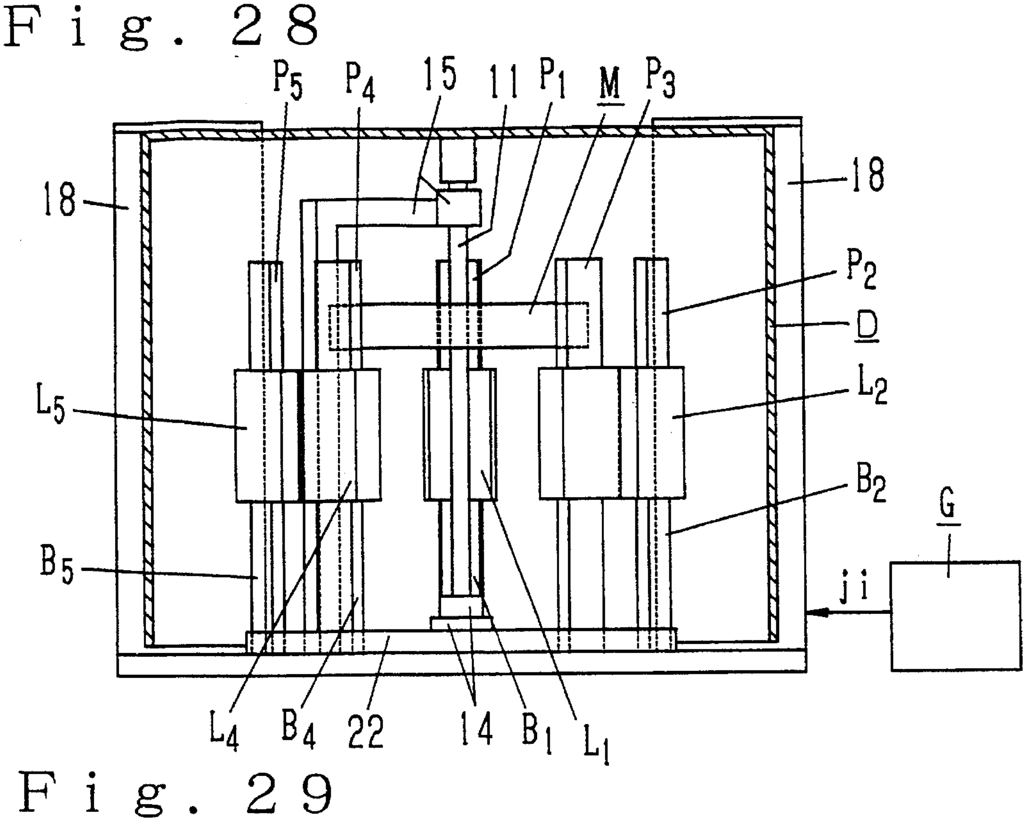
FIG. 28 is a schematic front view illustrating a second embodiment of the display element and a fourth embodiment of the display unit using it, with the display surface member shown in section.
Figure 29:
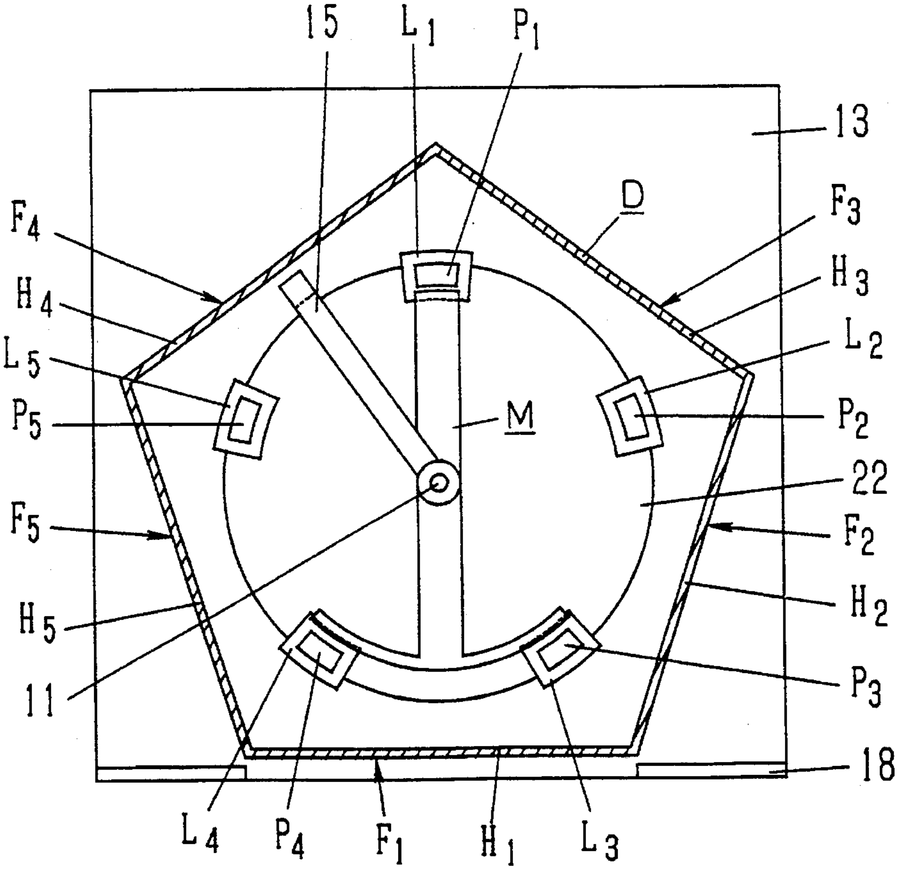
FIG. 29 is a schematic plan view of the display element of FIG. 28, with the display surface member shown in section.
Figure 30:
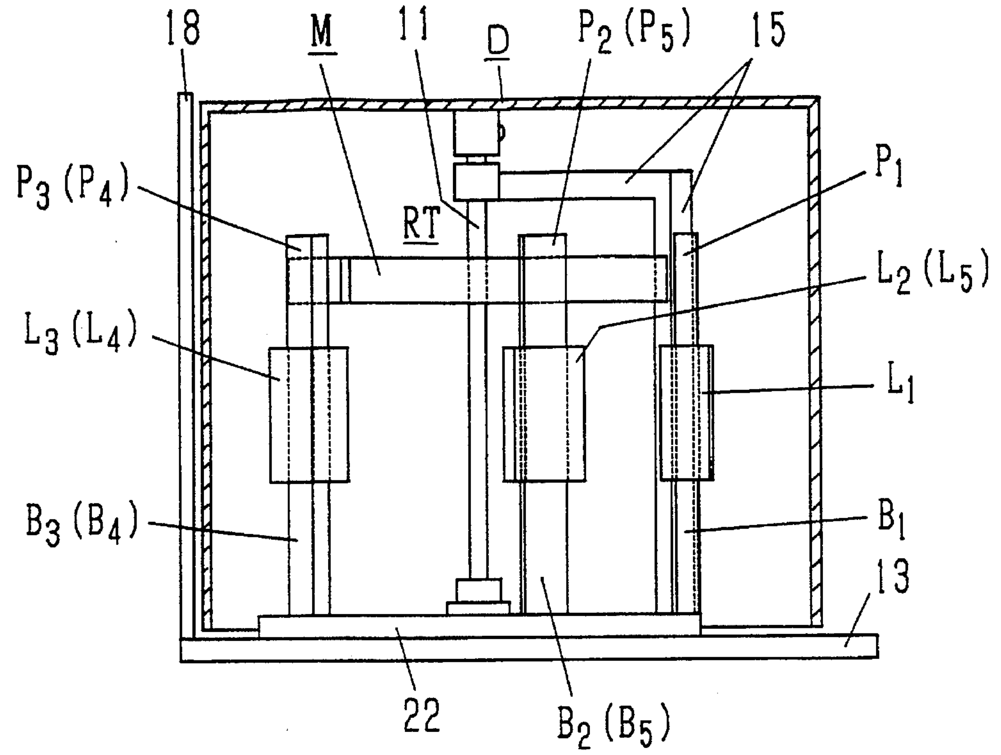
FIG. 30 is a schematic right side view of the display element of FIG. 28, with the display surface member shown in section.
Figure 31:
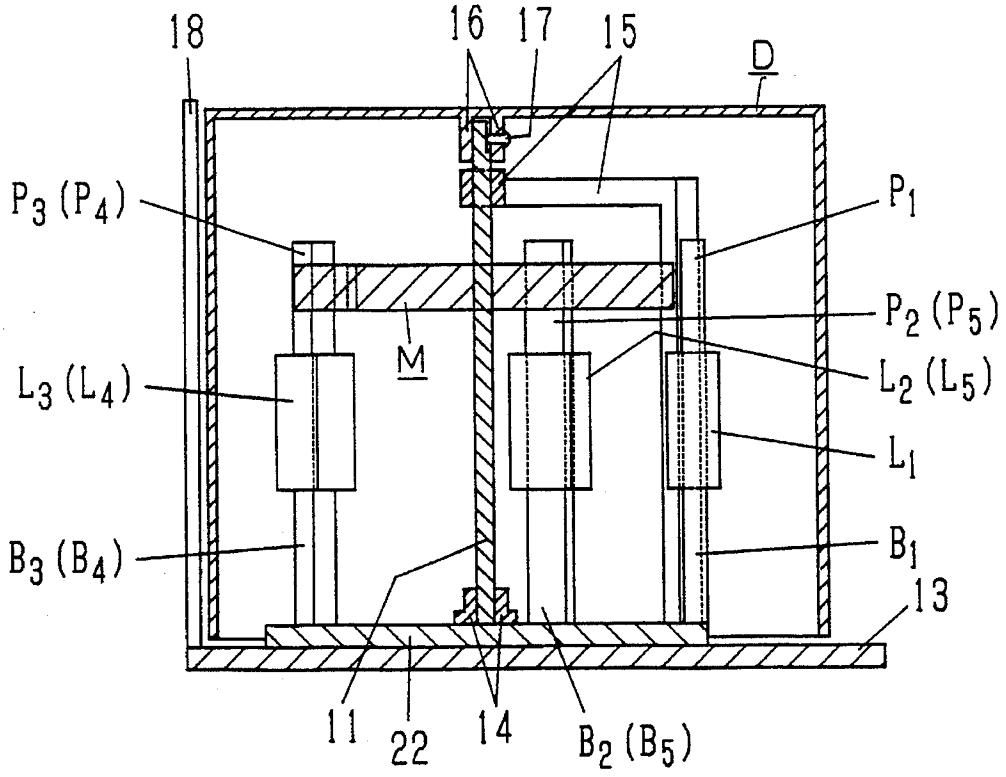
FIG. 31 is a schematic longitudinal-sectional view of the display element shown in FIG. 28.
Figure 32:
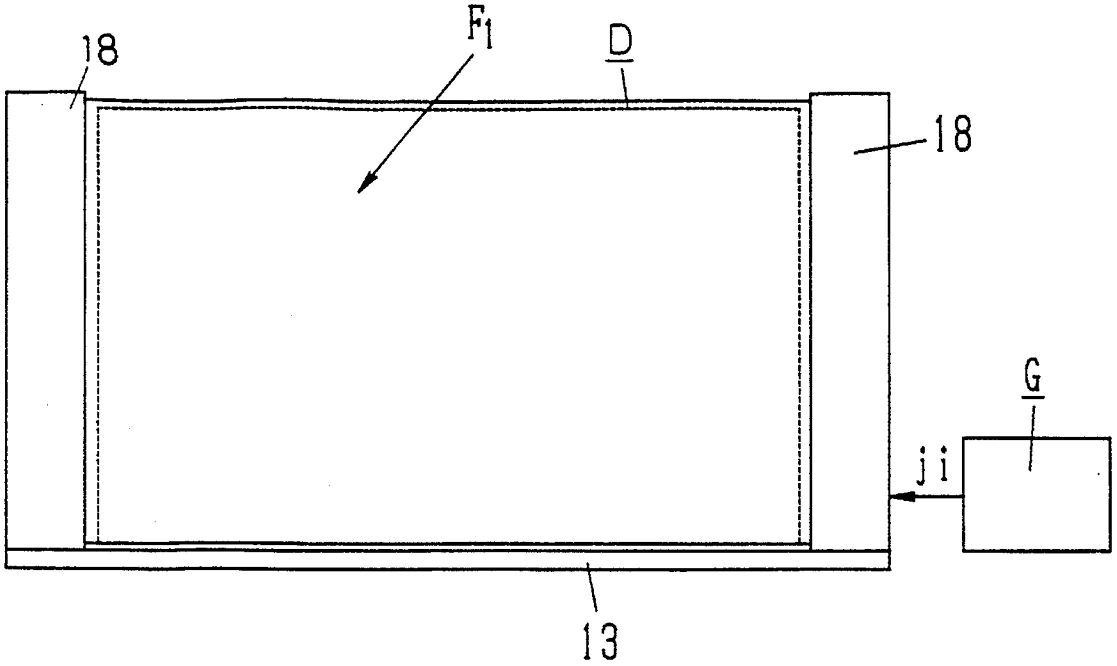
FIG. 32 is a schematic front view illustrating a third embodiment of the display element and a fifth embodiment of the display unit using it.
Figure 33:
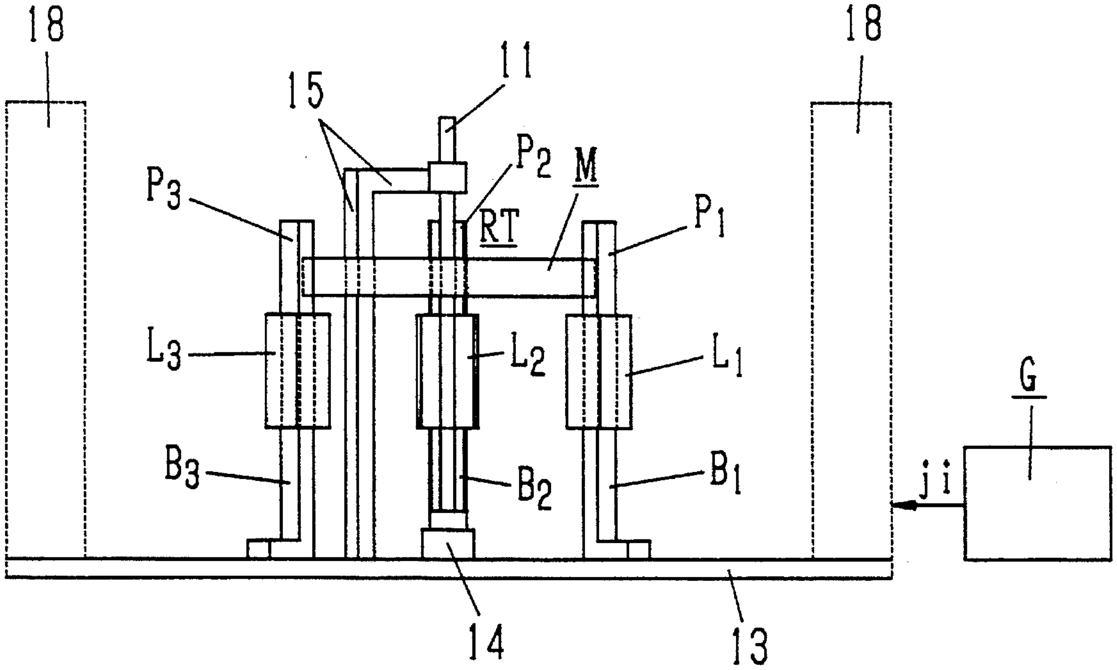
FIG. 33 is a schematic front view of the display element, with the display surface member taken away.
Figure 34:
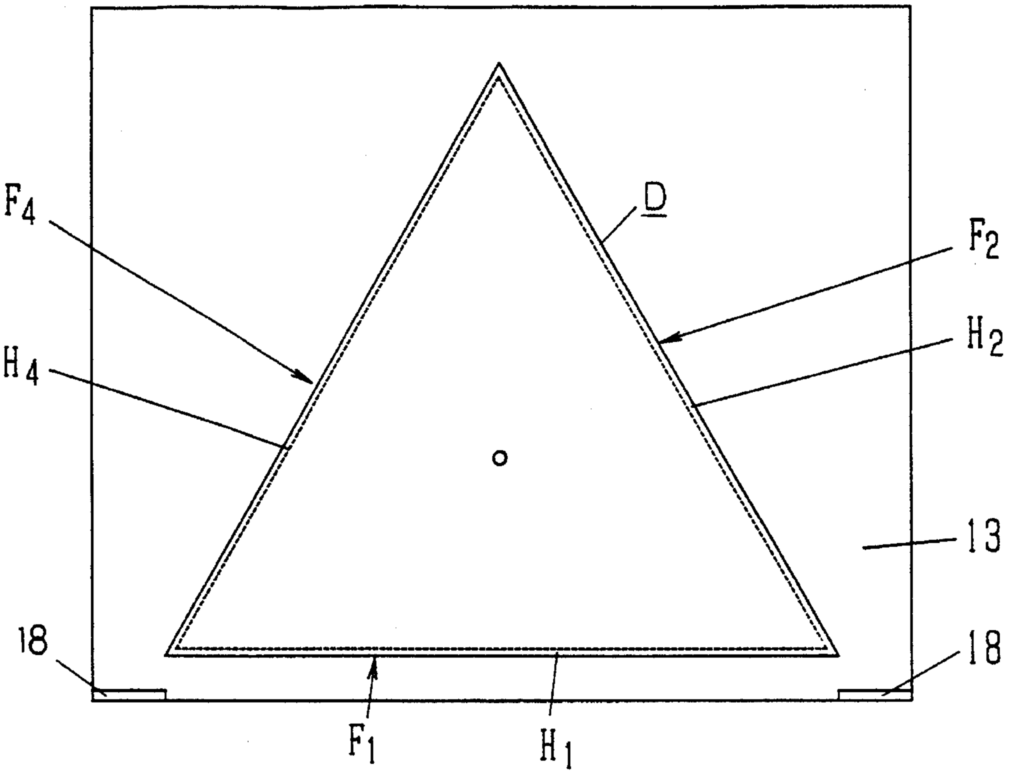
FIG. 34 is a schematic plan view of the display element shown in FIG. 32.
Figure 35:
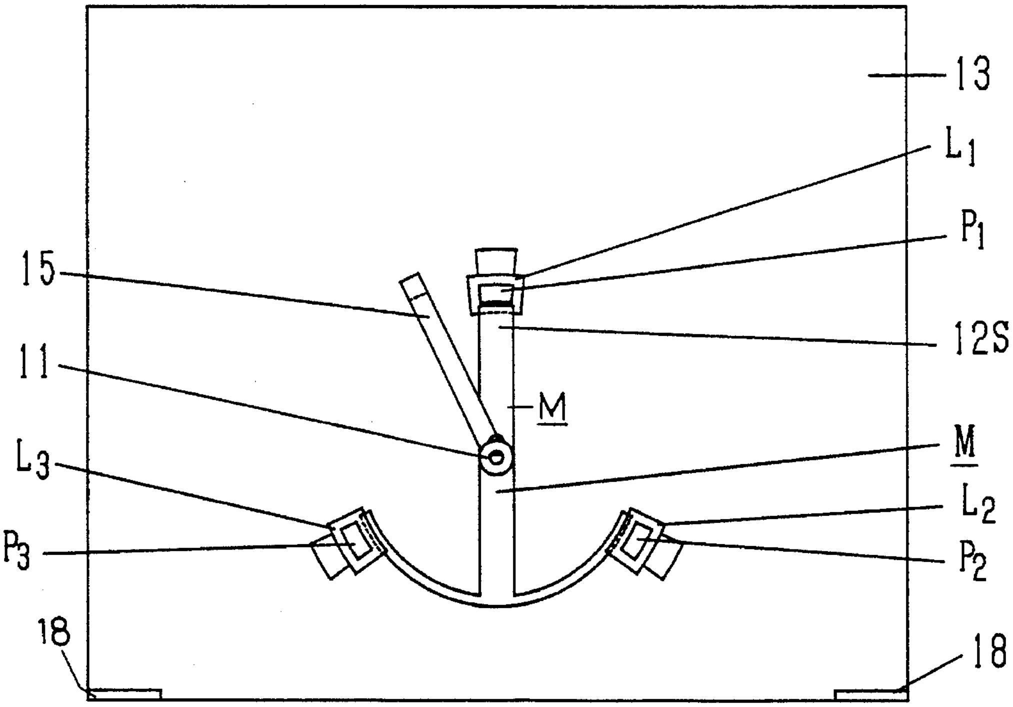
FIG. 35 is a schematic plan view of the display element of FIG. 32, with the display surface member taken away.
Figure 36:
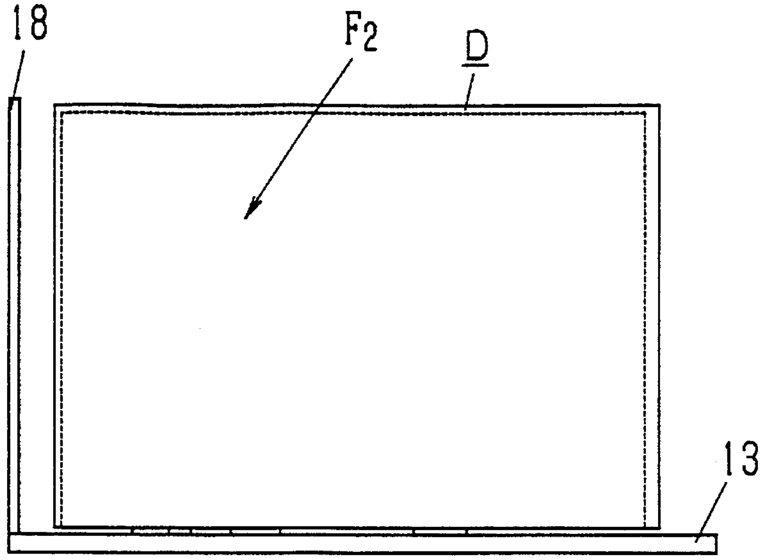
FIG. 36 is a schematic right side view of the display element shown in FIG. 32.
Figure 37:
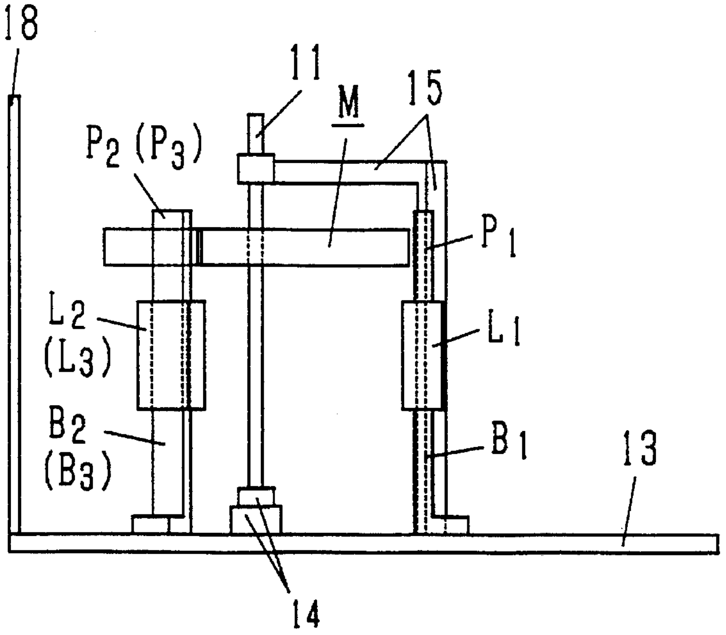
FIG. 37 is a schematic fight side view of the display element of FIG. 32, with the display surface member taken away; is
Figure 38:
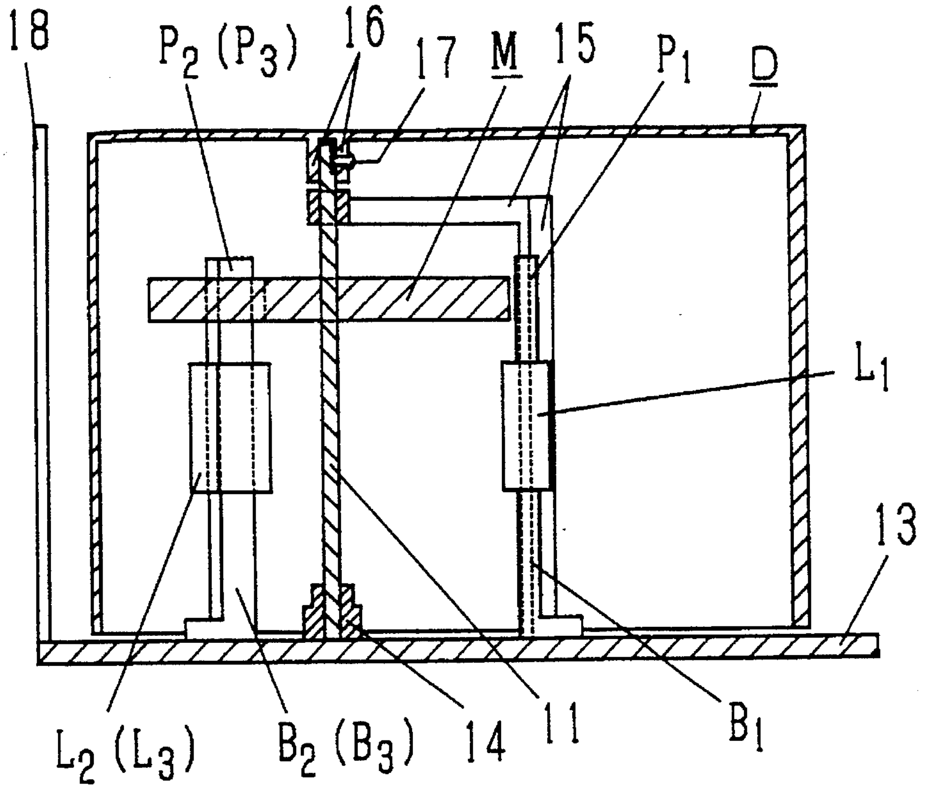
FIG. 38 is a schematic longitudinal-sectional view of the display element of FIG. 32 centrally thereof.
Figure 39:
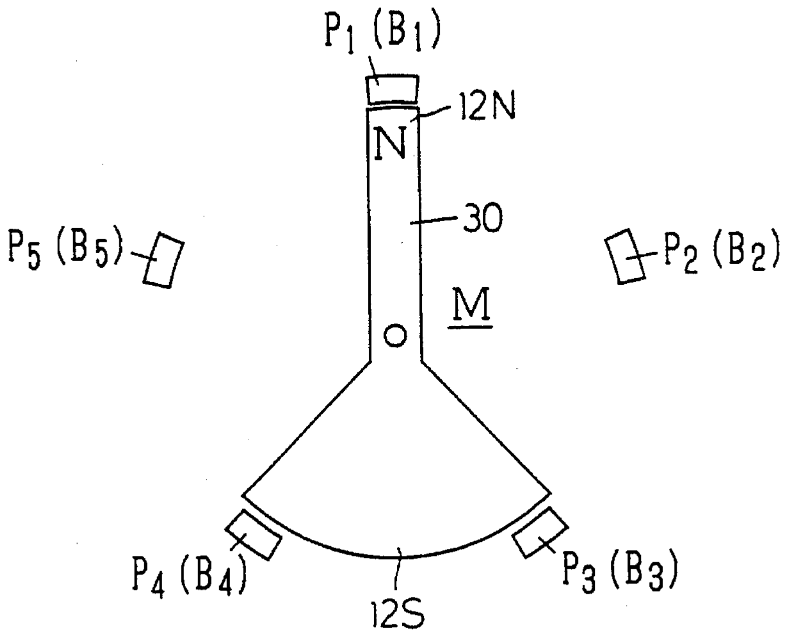
FIG. 39 is a schematic plan view illustrating an example of a magnet member for use as the rotor of the motor mechanism of the display element shown in FIG. 1.
Figure 40:
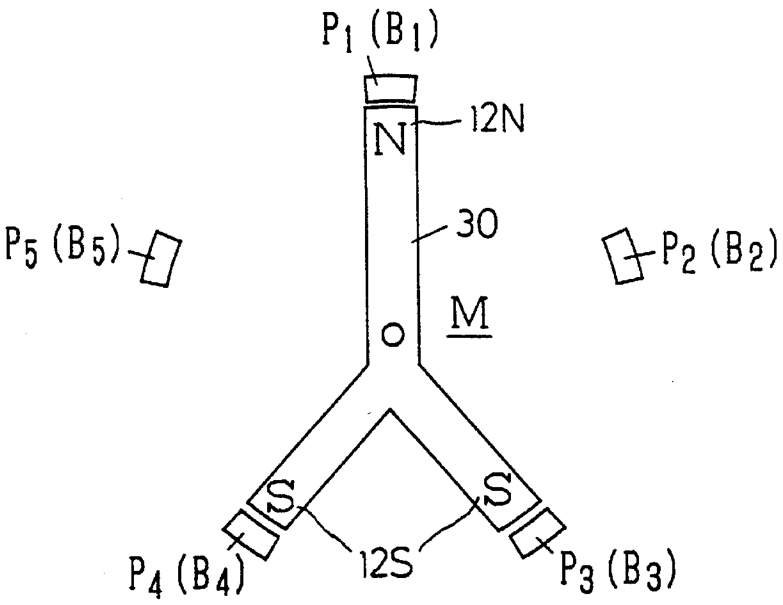
FIG. 40 is a schematic diagram showing another example of the magnet member.
Figure 41:
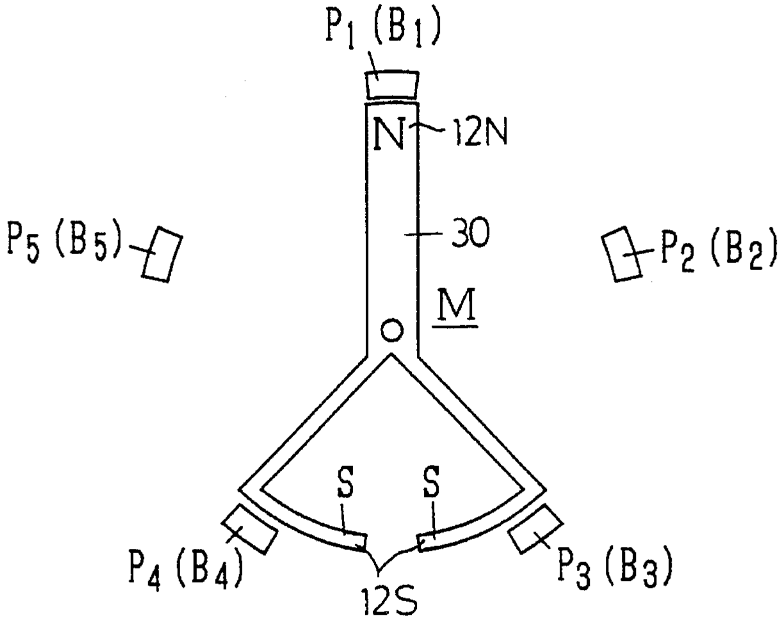
FIG. 41 is a schematic plan view showing still another example of the magnet member.
Figure 42:
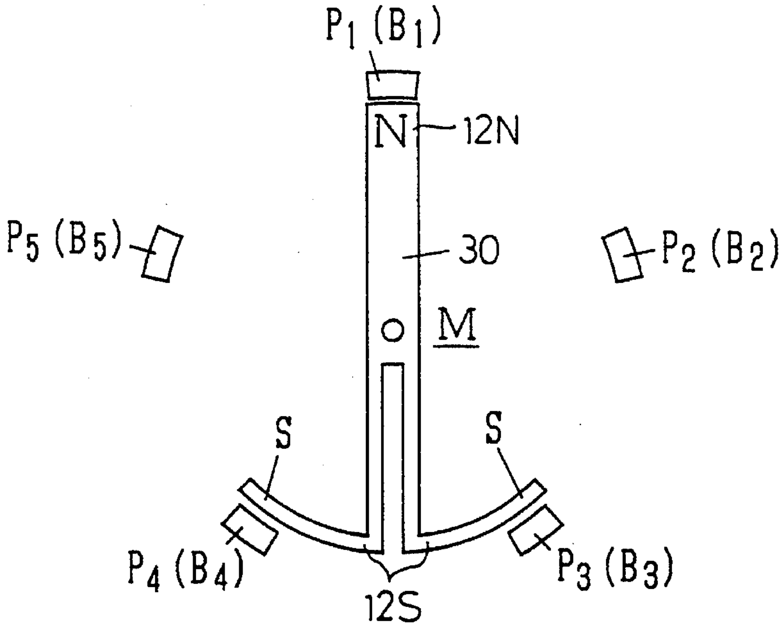
FIG. 42 is a schematic diagram showing still a further example of the magnet member.

This embodiment is identical in construction with the first embodiment except that the drive unit G used in the latter, described previously in respect of FIG. 8, is replaced with a drive unit G of the FIG. 27 structure which is a combination of the structures described with respect to FIGS. 8 and 22.

The third embodiment of such a construction is identical with the first embodiment, and hence produces combined effects of the first and second embodiments, though not described in detail.

(Embodiment 4)

Referring next to FIGS. 28 through 31, a fourth embodiment of the display unit of the present invention will be described which uses a second embodiment of the display element according to the present invention.

In FIGS. 28 through 31 the parts corresponding to those in FIGS. 1 through 12 and no detailed description will be given thereof.

This embodiment is identical in construction with the first embodiment except that in the latter the first through fifth magnetic members $B_1$–$B_5$ forming the stator ST of the motor mechanism are individually planted on the base plate 13, whereas in the former the first through fifth excitation windings $L_1$–$L_5$ wound on the first through fifth magnetic members $B_1$–$B_5$ are connected to a common plate-shaped magnetic member 22 at the side opposite from the magnetic poles $P_1$–$P_5$ of the first through fifth magnetic members $B_1$–$B_5$, the magnetic member 22 being mounted on the base plate 13.

The fourth embodiment is identical in construction with the first embodiment except the above-mentioned point and supplies power by the power supply means $J_i$ to the i-th excitation winding $L_i$ wound on the i-th magnetic member $B_i$ to magnetize the pole $P_i$ of the i-th magnetic member $B_i$ with the south magnetic pole, by which poles of all of the first thorough; fifth magnetic members $B_1$–$B_5$ except the i-th one. Hence, this embodiment provides more efficiently the same effects as obtainable with the first embodiment, not described in detail.

(Embodiment 5)

FIGS. 32 through 38 illustrate a fifth embodiment of the display unit of the present invention which uses a third embodiment of the display element according to the present invention. In FIGS. 32 through 38 the parts corresponding to those in FIGS. 1 through 12 and no detailed description will be given thereof.

This embodiment is identical in construction with the first embodiment except in the points mentioned below. In the first embodiment the display surface member D has five display surfaces, whereas in this embodiment the display surface member D has three display surfaces $F_1$–$F_3$. Consequently, the rotor RT of the motor mechanism Q has three magnetic members $B_1$–$B_3$ and three excitation windings $L_1$–$L_3$ wound thereon and the drive unit G has three power supply means $J_1$–$J_3$.

The display unit of this embodiment identical in construction with the first embodiment; hence, it is evident that this embodiment also provides the same results as are obtainable with the first embodiment.

The above-described embodiments should be construed as merely illustrative of the invention; for example, the magnet member M, shown in FIGS. 9 through 12, may be modified as depicted in FIGS. 39 through 42, though not described in detail. In FIGS. 39 through 42, as in the case of FIG. 9, the magnet M has the double-pole permanent magnet 30 and the first and second poles 12N and 12S at its both free ends. Moreover, though not shown, it is possible to employ: a construction which, as in the case of FIG. 10, has the double-pole permanent magnet 30 and the magnetic piece 31S, the free ends of which form the first and second poles 12N and 12S, respectively; a construction which, as in the case of FIG. 11, has the double-pole permanent magnet 30 and the magnetic piece 31N, the free ends of which form the second and first poles 12S and 12N; and a construction which, as in the case of FIG. 12, has the double-pole permanent magnet 30 and the magnetic pieces 31N and 31S, the free ends of the magnetic pieces 31N and 31S forming the first and second poles 12N and 12S.

The forth embodiment of the display unit of FIGS. 28 through 31 may utilize the drive unit G shown in connection with the second or third embodiment.

Also in the fifth embodiment of the display unit depicted in FIGS. 32 through 38, the lower ends of the magnetic members $B_1$–$B_3$ may be connected to the common magnetic member 22, and of course, such a drive unit G can be formed as shown in the second or third embodiment.

While in the above the present invention has been described in connection with the case where the rotor RT is what is called an inner rotor type, it can be formed as an outer rotor type configuration. Moreover, the first and second poles 12N and 12S of the magnet M may be used as the "S pole" and "N pole," respectively, to obtain the same results as those described above.

It will be apparent that many modifications and variations may be effected without departing from the scope of the novel concepts of the present invention.

What is claimed is:

1. A display element with an odd number of display surfaces, comprising:

a display surface member having three or more odd number of first through n-th display surfaces and a permanent magnet type motor mechanism having a rotor and a stator;

wherein said display surface member is mounted on said rotor of said permanent magnet type motor mechanism housed therein;

wherein said first through n-th display surfaces of said display surface member are disposed side by side at equiangular intervals around said rotor of said motor mechanism;

wherein said rotor of said permanent magnet type motor mechanism has an odd number n of first through n-th magnetic members each forming a magnetic pole at one free end and first through n-th excitation windings wound on said first through n-th magnetic members, respectively;

wherein said magnetic poles of said first through n-th magnetic members are disposed side by side around the axis of said rotor of said permanent magnet type motor mechanism; and wherein said rotor of said permanent magnet type motor mechanism has a magnet with first and second magnetic poles magnetized in opposite polarities;

characterized in that, letting one of said first through n-th magnetic members be identified as an i-th magnetic member, (A) said first magnetized pole of said magnet member is opposed to the magnetic pole of said i-th magnet and (B) said second magnetized pole of said magnet member is opposed to: (a) the magnetic poles of $(i+(n-1)/2)$th and $(i+(n-1)/2+1)$th magnetic members when $i<(n+1)/2$; (b) the magnetic poles of $(i+(n-1)/2)$th and $(i-(n-1)/2)$th magnetic members when $i=(n+1)/2$; and (c) the magnetic poles of $(i-(n+1)/2)$th and $(i-(n+1)/2+1)$th magnetic members when $i>(n+1)/2$.

2. The display element of claim 1, wherein said magnet member forming said rotor of said permanent magnet type motor mechanism has a double-pole permanent magnet, both free ends of said double-pole permanent magnet forming said first and second magnetized poles, respectively.

3. The display element of claim 1, wherein said magnet member forming said rotor of said permanent magnet type motor mechanism has a double-pole permanent magnet and a magnetic piece connected to one free end of said double-pole permanent magnet, the other free end of said double-pole permanent magnet forming said first magnetized pole and the free end of said magnetic piece forming said second magnetized pole.

4. The display element of claim 1, wherein said magnet member forming said rotor of said permanent magnet type motor mechanism has a double-pole permanent magnet and a magnetic piece connected to one free end of said double-pole permanent magnet, the other free end of said double-pole permanent magnet forming said second magnetized pole and the free end of said magnetic piece forming said first magnetized pole.

5. The display element of claim 1, wherein said magnet member forming said rotor of said permanent magnet type motor mechanism has a double-pole permanent magnet and first and second magnetic pieces connected to both free ends, respectively, the free ends of said first and second magnetic pieces forming said first and second magnetized poles.

6. The display element of claim 1, 2, 3, 4, or 5, wherein said first through n-th magnetic members forming said stator of said permanent magnet type motor mechanism are connected to a common magnetic member at the side opposite from the magnetic poles of said first through n-th magnetic members as viewed from said first through n-th excitation windings wound thereon.

7. A display unit comprising said display element having an odd number of display surfaces, described in claim 1, 2, 3, 4, 5, or 6, and a drive unit for driving said display element, wherein said drive unit has i-th power supply means for supplying power to an i-th one of said first through n-th magnetic members so that the magnetic pole of said i-th magnetic member is magnetized in a polarity opposite to that of said first magnetic pole of said magnet member.

8. A display unit comprising said display element having an odd number of display surfaces, described in claim 1, 2, 3, 4, 5, or 6, and a drive unit for driving said display element, wherein said drive unit has i-th power supply means whereby: (a) when $i<(n+1)/2$, power is supplied to $(i+(n-1)/2)$th and $(i+(n-1)/2+1)$th ones of said first through n-th excitation windings so that the magnetic poles of said $(i+(n-1)/2)$th and $(i+(n-1)/2+1)$th magnetic members are magnetized in a polarity opposite to that of said second magnetized pole of said magnet member; (b) when $i=(n+1)/2$, power is supplied to $(i+(n-1)/2)$th and $(i-(n-1)/2)$th ones of said first through n-th excitation windings so that the magnetic poles of said $(i+(n-1)/2)$th and $(i-(n-1)/2)$th magnetic members are magnetized in a polarity, opposite to that of said second magnetic pole of said magnet member; and (c) when $i>(n+1)/2$, power is supplied to $(i-(n+1)/2)$th and $(i-(n+1)/2+1)$th ones of said first through n-th excitation ,windings so that the magnetic poles of said $(i-(n+1)/2)$th and $(i-(n+1)/2+1)$th magnetic members are magnetized in a polarity opposite to that of said second magnetic poles of said magnet member.

* * * * *